United States Patent
Braedt et al.

(10) Patent No.: US 11,946,528 B2
(45) Date of Patent: Apr. 2, 2024

(54) BICYCLE CHAIN

(71) Applicant: SRAM Deutschland GmbH, Schweinfurt (DE)

(72) Inventors: Henrik Braedt, Hambach (DE); Sebastian Heyna, Hambach (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 34 days.

(21) Appl. No.: 17/065,772

(22) Filed: Oct. 8, 2020

(65) Prior Publication Data

US 2021/0102603 A1 Apr. 8, 2021

(30) Foreign Application Priority Data

Oct. 8, 2019 (DE) .................. 10 2019 006 974.9
Sep. 14, 2020 (DE) .................. 10 2020 211 481.1

(51) Int. Cl.
| | |
|---|---|
| *F16G 13/06* | (2006.01) |
| *B62M 9/00* | (2006.01) |
| *B62M 9/04* | (2006.01) |
| *B62M 9/06* | (2006.01) |
| *B62M 9/10* | (2006.01) |
| *B62M 9/12* | (2006.01) |
| *F16G 13/02* | (2006.01) |

(52) U.S. Cl.
CPC .............. *F16G 13/06* (2013.01); *B62M 9/04* (2013.01); *B62M 9/06* (2013.01); *B62M 9/10* (2013.01); *B62M 9/105* (2013.01); *F16G 13/02* (2013.01); *B62M 2009/005* (2013.01)

(58) Field of Classification Search
CPC .... B62M 9/00; B62M 9/02; B62M 2009/005; B62M 9/06; B62M 9/10; B62M 9/105; B62M 9/12; B62M 9/04; F16G 13/00; F16G 13/02; F16G 13/06; F16G 13/07; F16G 13/08; F16G 13/10; F16H 7/06
USPC ........ 474/206, 209, 226, 228, 229, 230, 231
See application file for complete search history.

(56) References Cited

U.S. PATENT DOCUMENTS

| | | | |
|---|---|---|---|
| 2,219,125 A | 10/1940 | Bremer | |
| 7,325,391 B1 * | 2/2008 | Oishi | F16G 13/06 59/5 |
| 8,066,604 B2 * | 11/2011 | Righi | F16G 13/06 474/228 |
| 9,255,624 B2 * | 2/2016 | Fukumori | F16G 13/06 |
| 9,303,725 B2 * | 4/2016 | Fukumori | B62M 9/00 |
| 9,303,726 B2 * | 4/2016 | Fukumori | F16G 13/06 |
| 9,939,045 B2 * | 4/2018 | Fukumori | F16G 13/06 |
| 10,480,617 B2 * | 11/2019 | Fukumori | F16G 13/02 |

(Continued)

FOREIGN PATENT DOCUMENTS

| | | |
|---|---|---|
| DE | 10127139 | 1/2003 |
| DE | 102008031162 | 1/2010 |

(Continued)

*Primary Examiner* — Michael R Mansen
*Assistant Examiner* — Raveen J Dias

(57) ABSTRACT

A chain and an inner link plate for a bicycle chain having chain rollers is provided. A protrusion of the inner link plate in relation to the respectively assigned chain roller in a front lower longitudinal end region of an inner link plate outer periphery is reduced, in comparison to the protrusion in a front upper longitudinal end region and/or in a rear lower longitudinal end region of the inner link plate outer periphery.

12 Claims, 20 Drawing Sheets

(56) References Cited

U.S. PATENT DOCUMENTS

| | | | | |
|---|---|---|---|---|
| 10,533,633 | B2* | 1/2020 | Dos Santos | F16G 13/06 |
| 10,618,598 | B2* | 4/2020 | Fukumori | F16G 15/12 |
| 10,641,356 | B2* | 5/2020 | Fukumori | F16G 13/06 |
| 10,648,538 | B2* | 5/2020 | Akanishi | F16G 13/06 |
| 10,703,441 | B2* | 7/2020 | Dos Santos | B62M 1/36 |
| 10,760,647 | B2* | 9/2020 | Chin | F16G 13/06 |
| 10,794,452 | B2* | 10/2020 | Fukumori | F16G 15/04 |
| 10,982,733 | B2* | 4/2021 | Akanishi | B62M 9/00 |
| 10,982,734 | B2* | 4/2021 | Ribeiro | F16G 13/06 |
| 11,078,987 | B2* | 8/2021 | Fukumori | B62M 9/00 |
| 11,174,915 | B2* | 11/2021 | Dos Santos | F16G 13/06 |
| 2013/0139642 | A1* | 6/2013 | Reiter | F16H 55/30 74/594.2 |
| 2014/0364259 | A1* | 12/2014 | Reiter | F16H 55/30 474/155 |
| 2015/0094180 | A1* | 4/2015 | Fukumori | F16G 13/06 474/206 |
| 2015/0094181 | A1* | 4/2015 | Fukumori | F16G 13/06 474/206 |
| 2015/0094182 | A1* | 4/2015 | Fukumori | F16G 13/06 474/206 |
| 2015/0226306 | A1* | 8/2015 | Pfeiffer | B62M 9/105 474/152 |
| 2015/0226307 | A1* | 8/2015 | Pfeiffer | F16H 7/06 474/152 |
| 2015/0226308 | A1* | 8/2015 | Pfeiffer | B62M 9/105 474/152 |
| 2015/0285363 | A1* | 10/2015 | Pfeiffer | B62M 9/10 474/152 |
| 2017/0234403 | A1 | 8/2017 | Sano | |
| 2018/0031077 | A1* | 2/2018 | Ribeiro | F16G 13/06 |
| 2018/0313432 | A1* | 11/2018 | Ribeiro | F16G 13/06 |
| 2019/0048973 | A1* | 2/2019 | Fukumori | F16H 55/30 |
| 2019/0048974 | A1* | 2/2019 | Fukumori | B62M 9/00 |
| 2019/0100278 | A1* | 4/2019 | Fukumori | B62M 9/00 |
| 2019/0346020 | A1* | 11/2019 | Dos Santos | B62M 9/00 |
| 2019/0368575 | A1* | 12/2019 | Chin | F16G 13/06 |
| 2020/0158208 | A1* | 5/2020 | Ribeiro | F16G 13/06 |
| 2021/0324941 | A1* | 10/2021 | Fukumori | F16G 13/06 |
| 2022/0056984 | A1* | 2/2022 | Dos Santos | F16G 13/06 |
| 2022/0099158 | A1* | 3/2022 | Wang | F16G 13/06 |
| 2023/0213086 | A1* | 7/2023 | Braedt | B62M 9/10 474/157 |

FOREIGN PATENT DOCUMENTS

| | | |
|---|---|---|
| DE | 102014215963 A1 | 4/2015 |
| DE | 102015219522 | 4/2016 |
| DE | 102017009632 | 5/2018 |

* cited by examiner

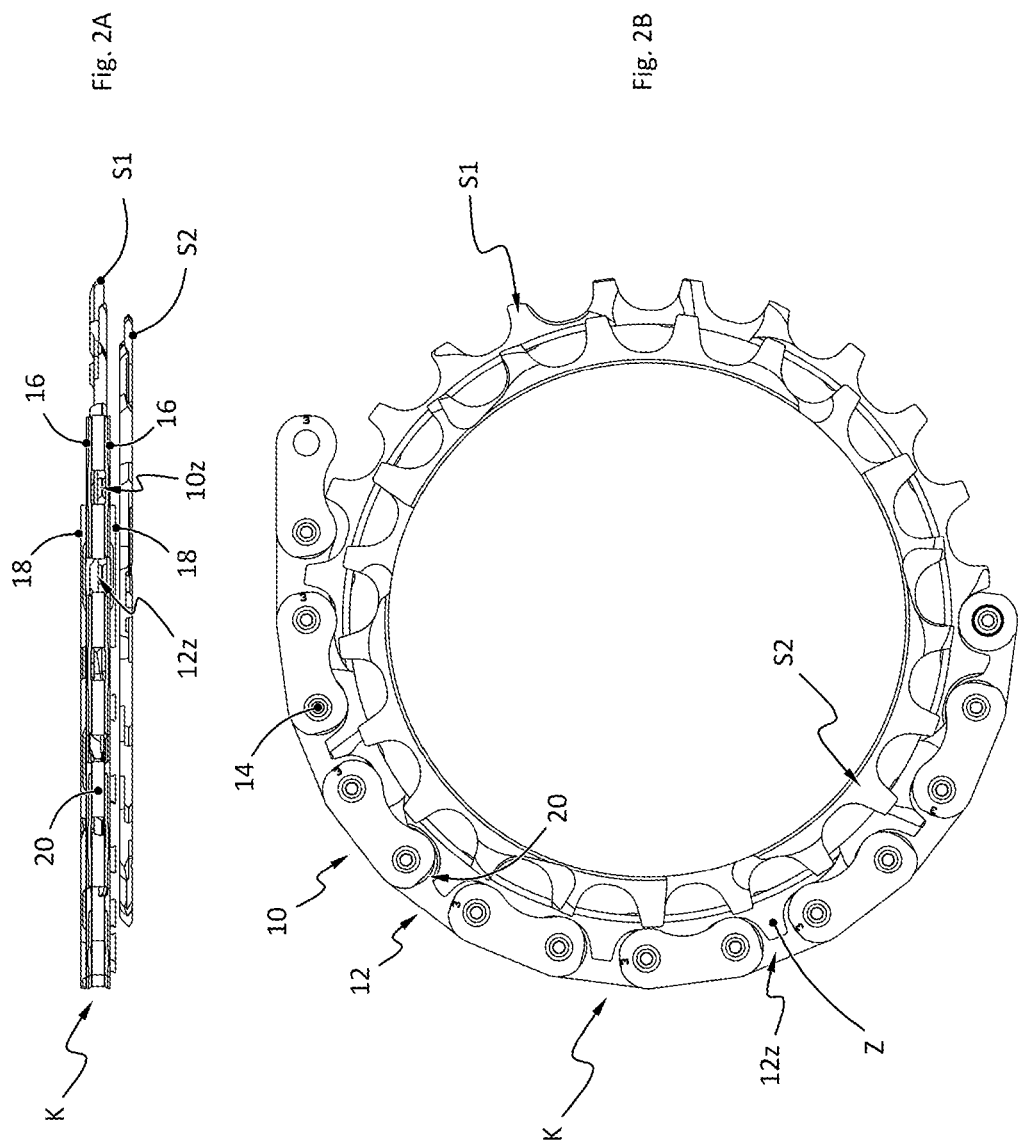

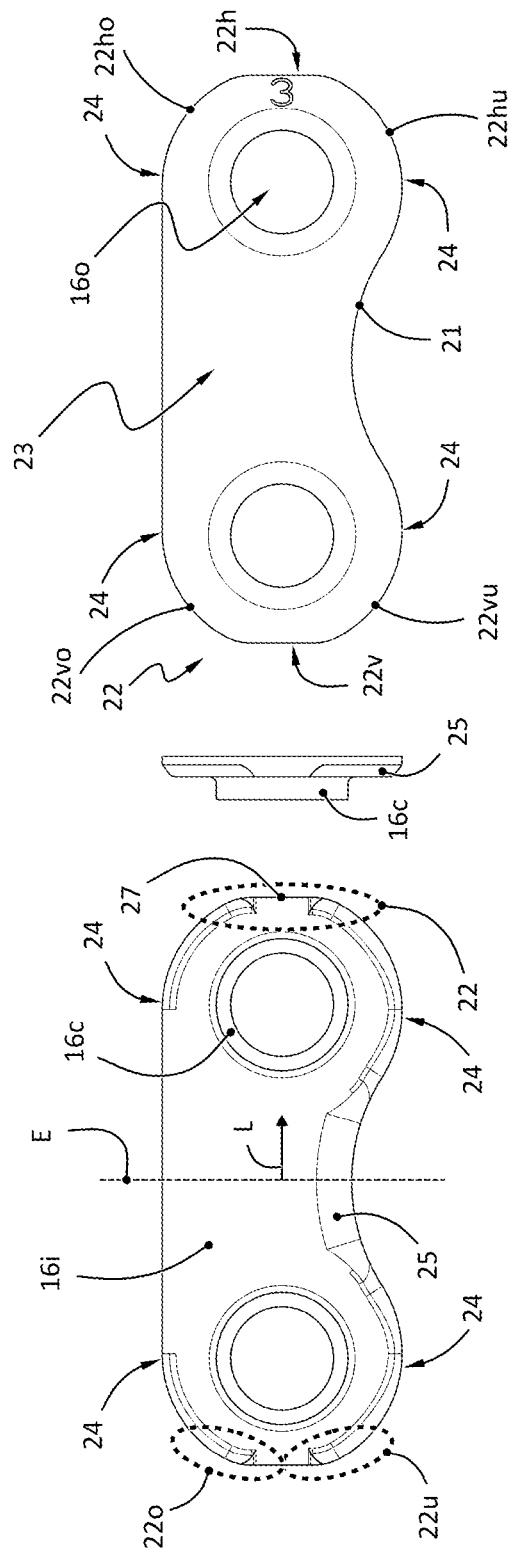

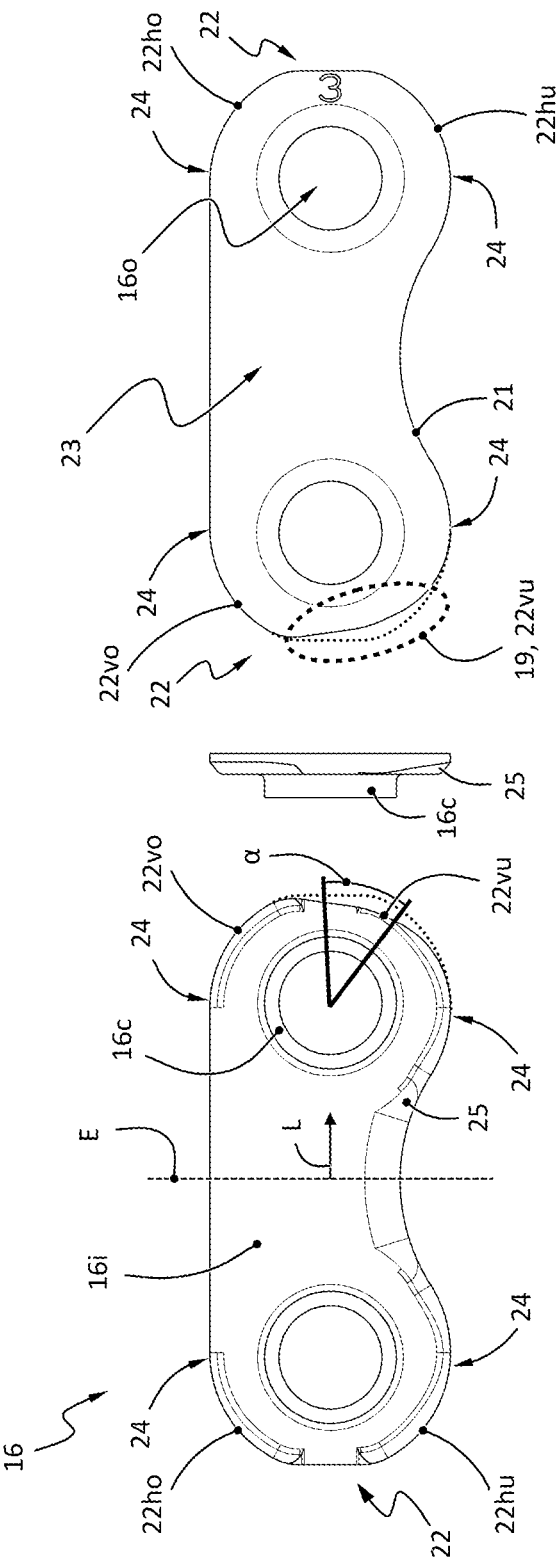

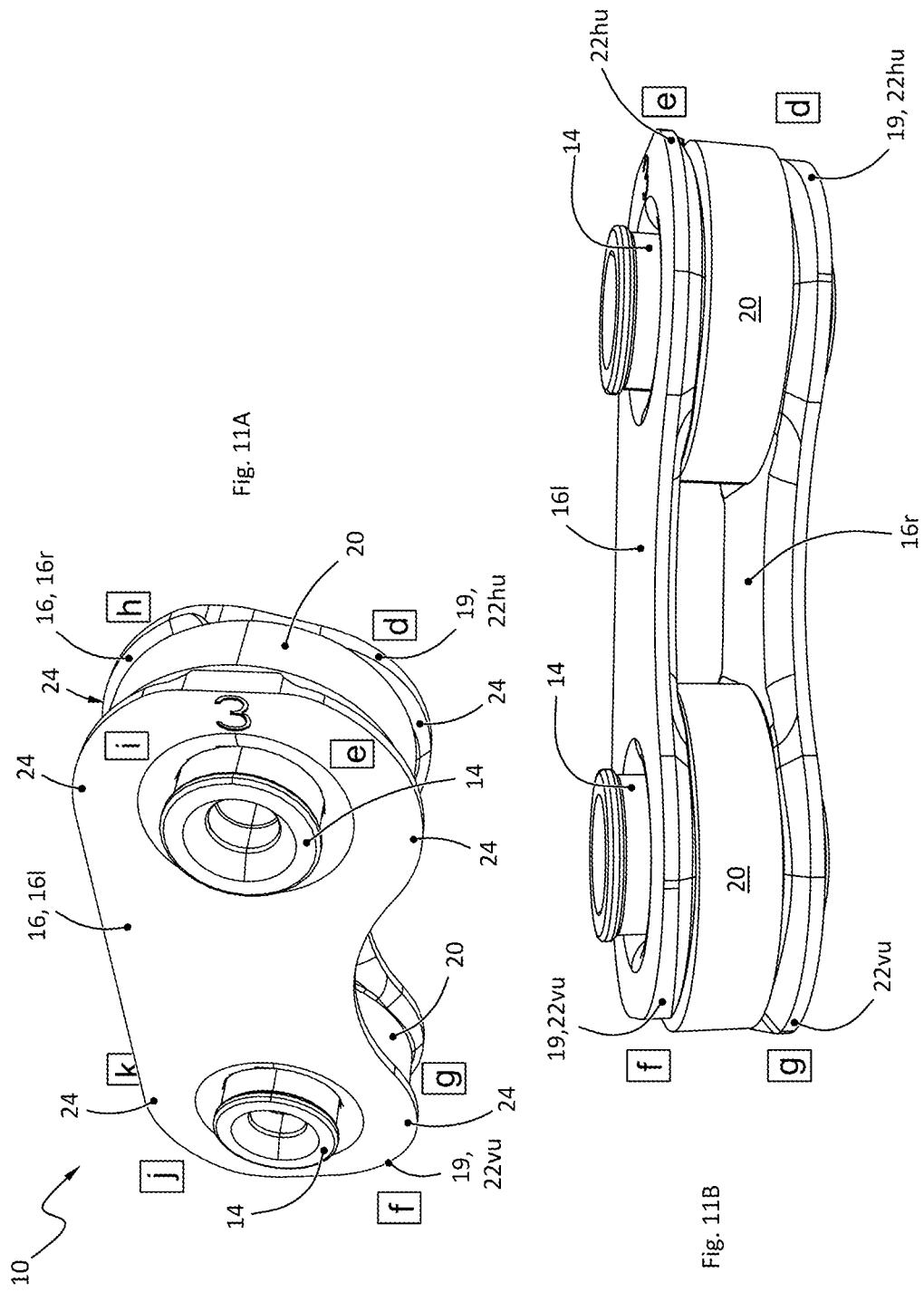

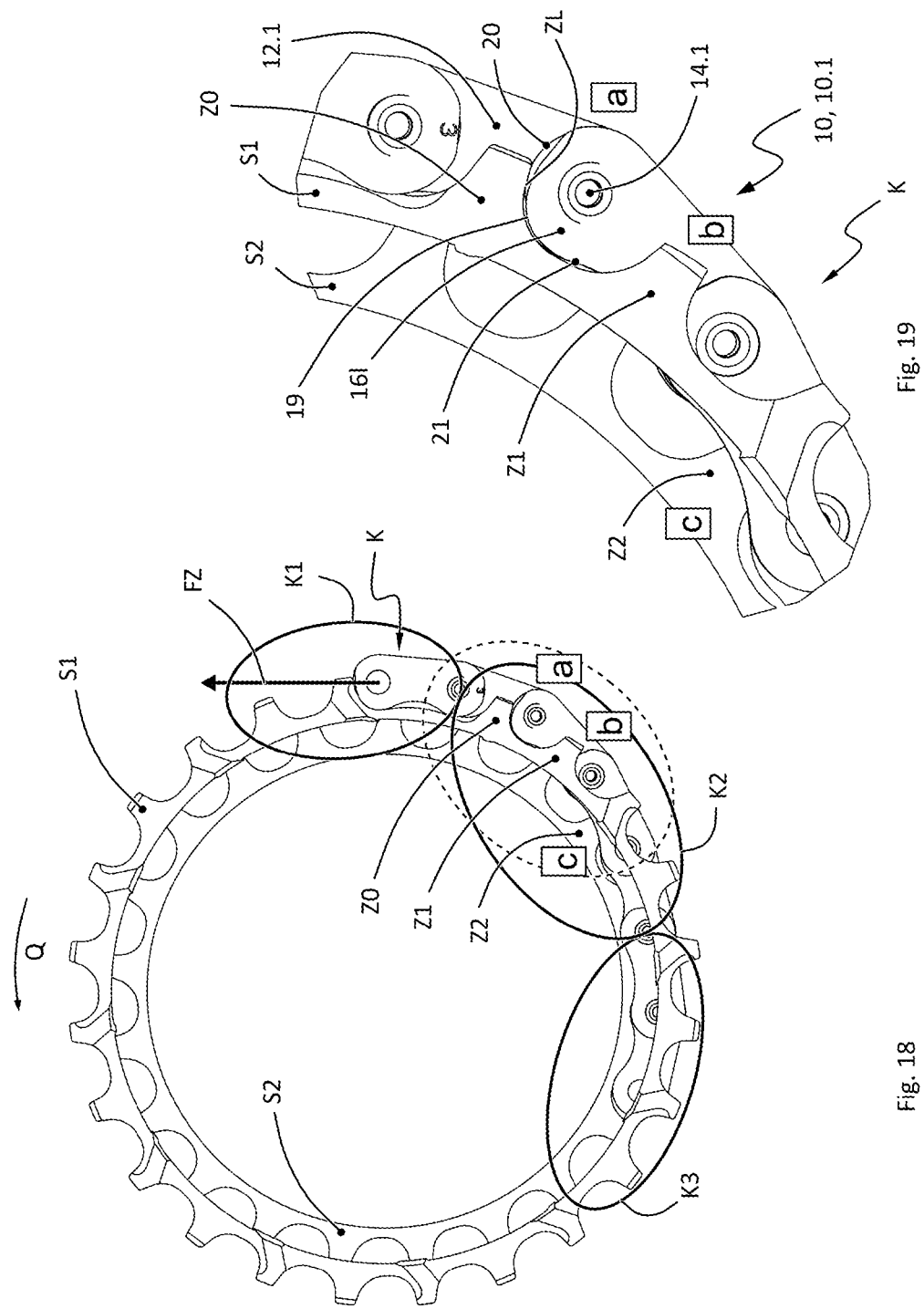

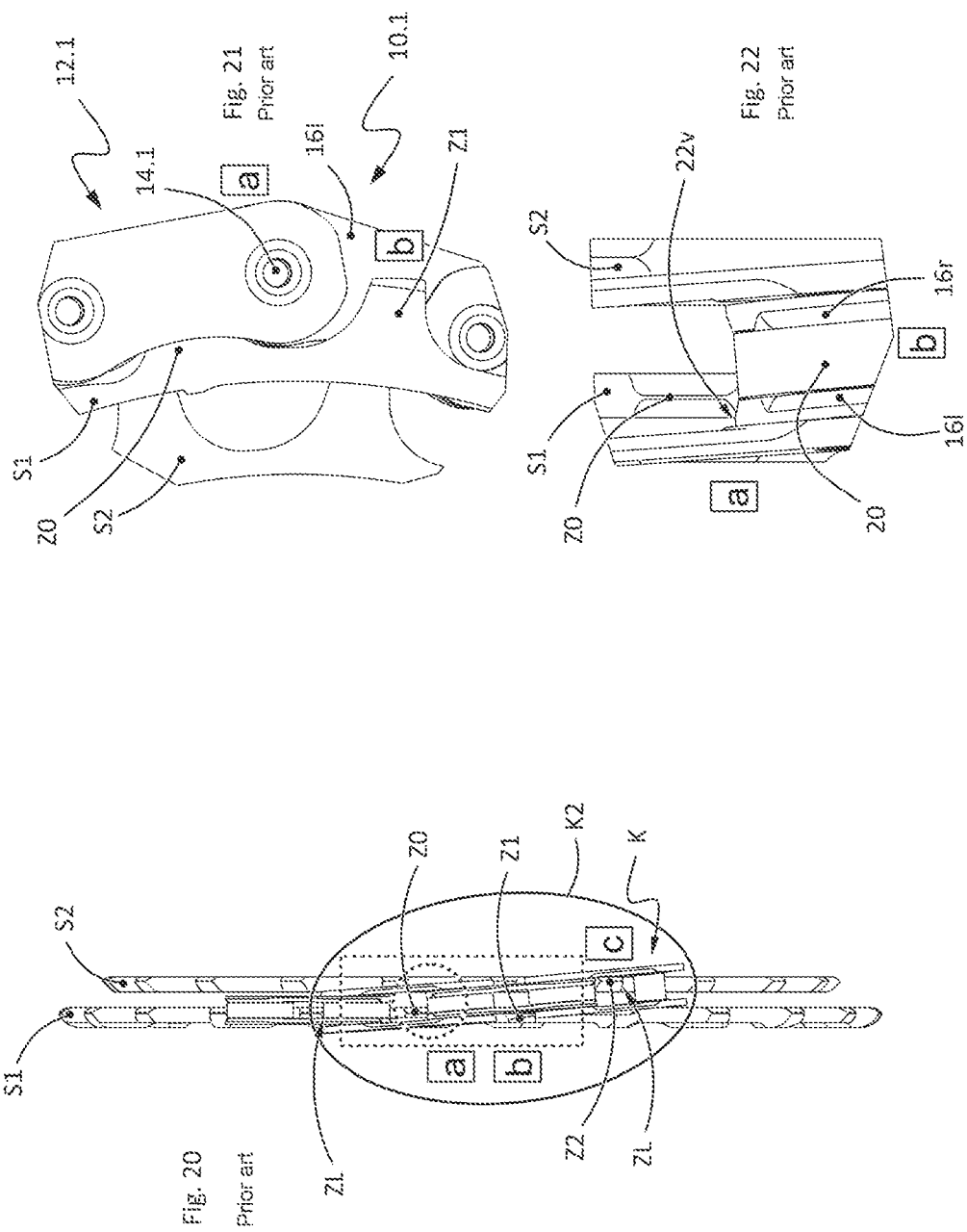

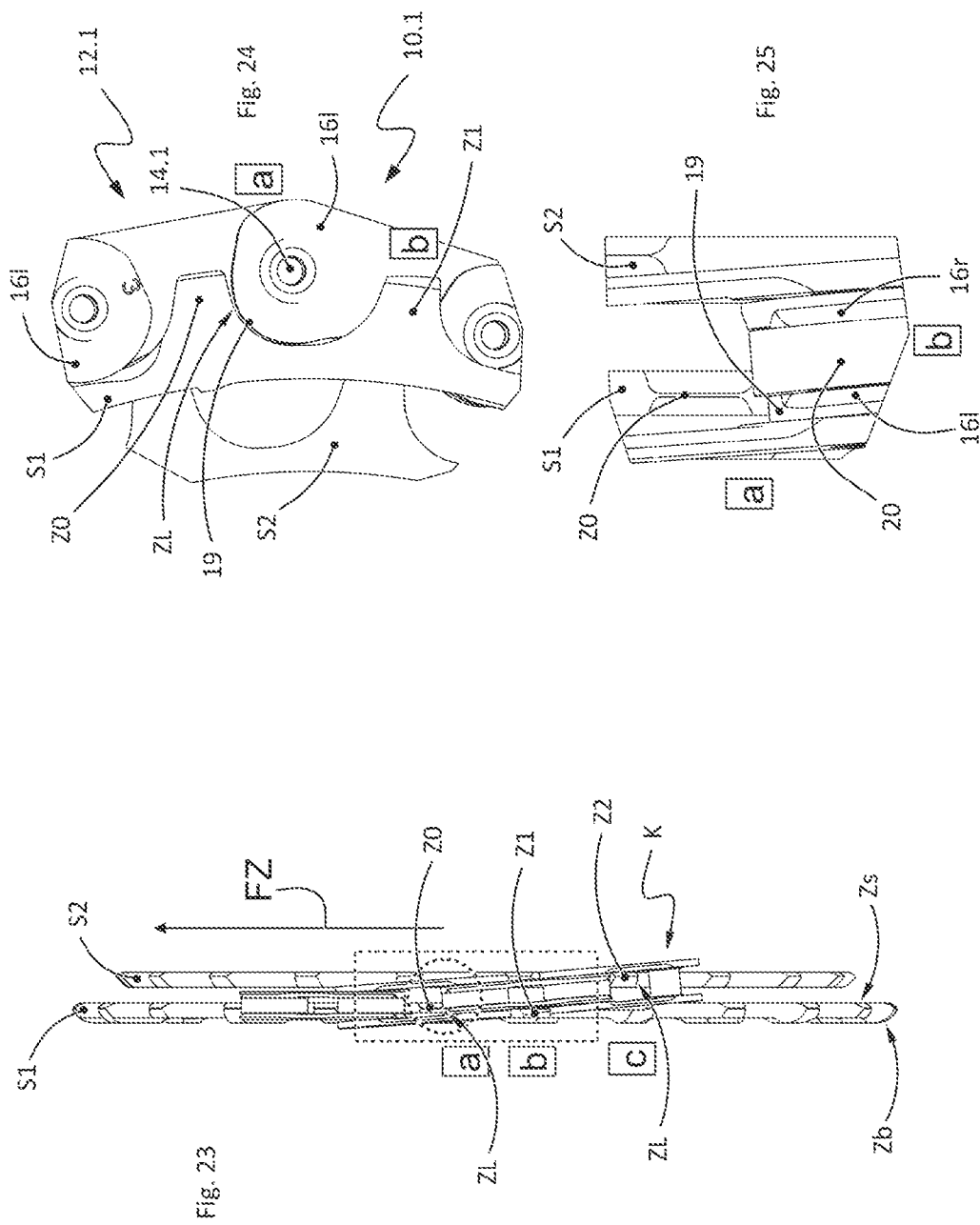

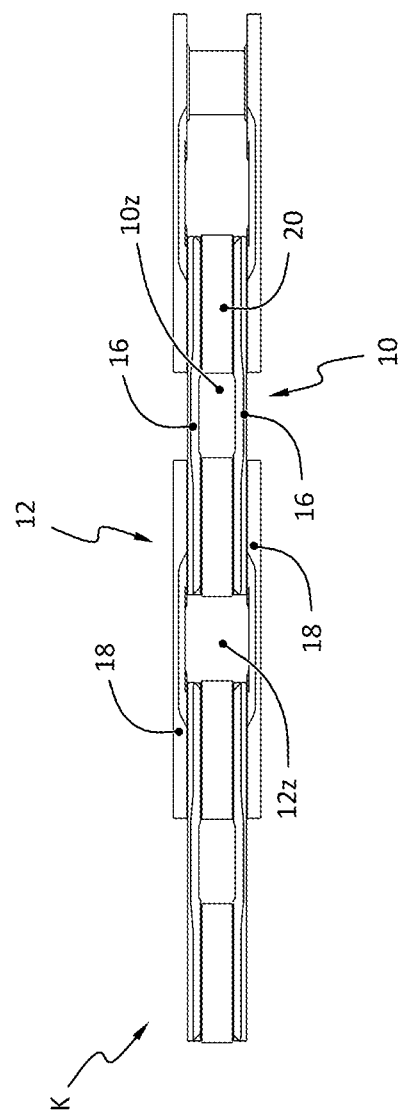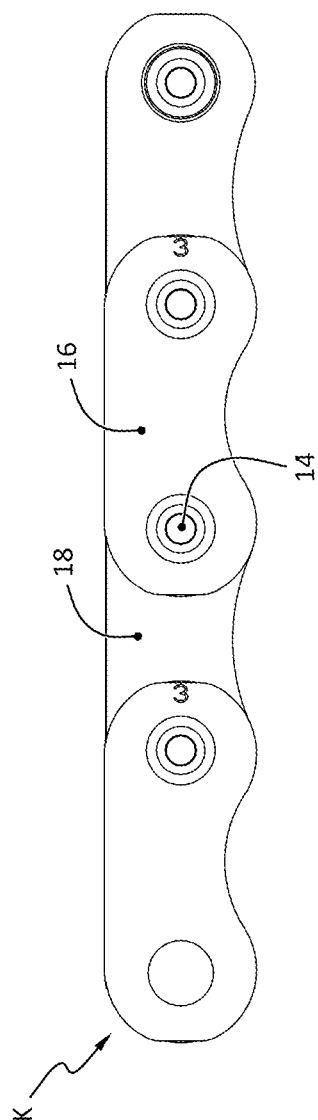

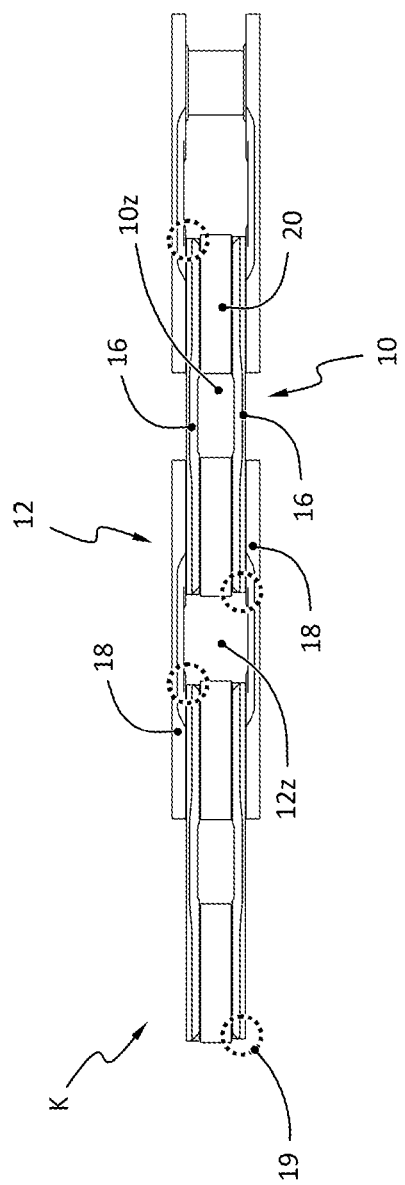
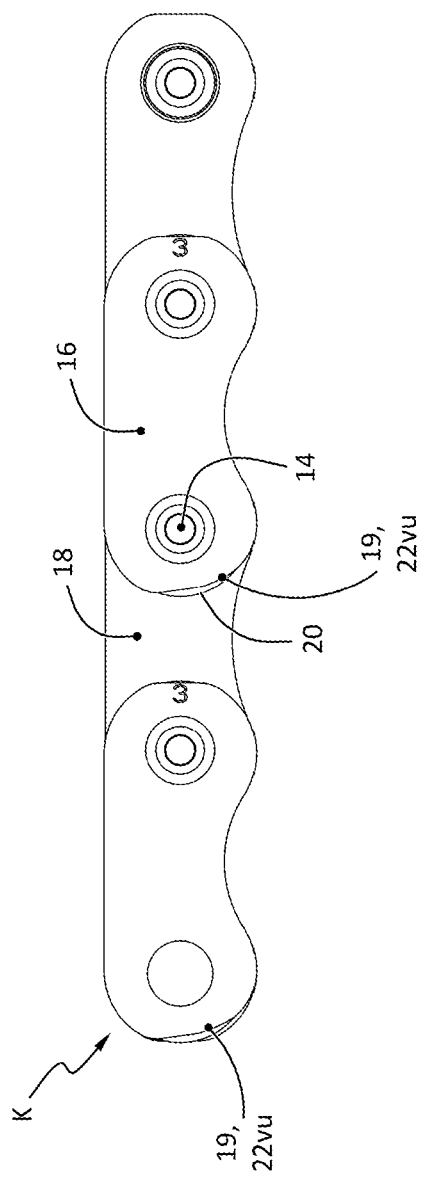

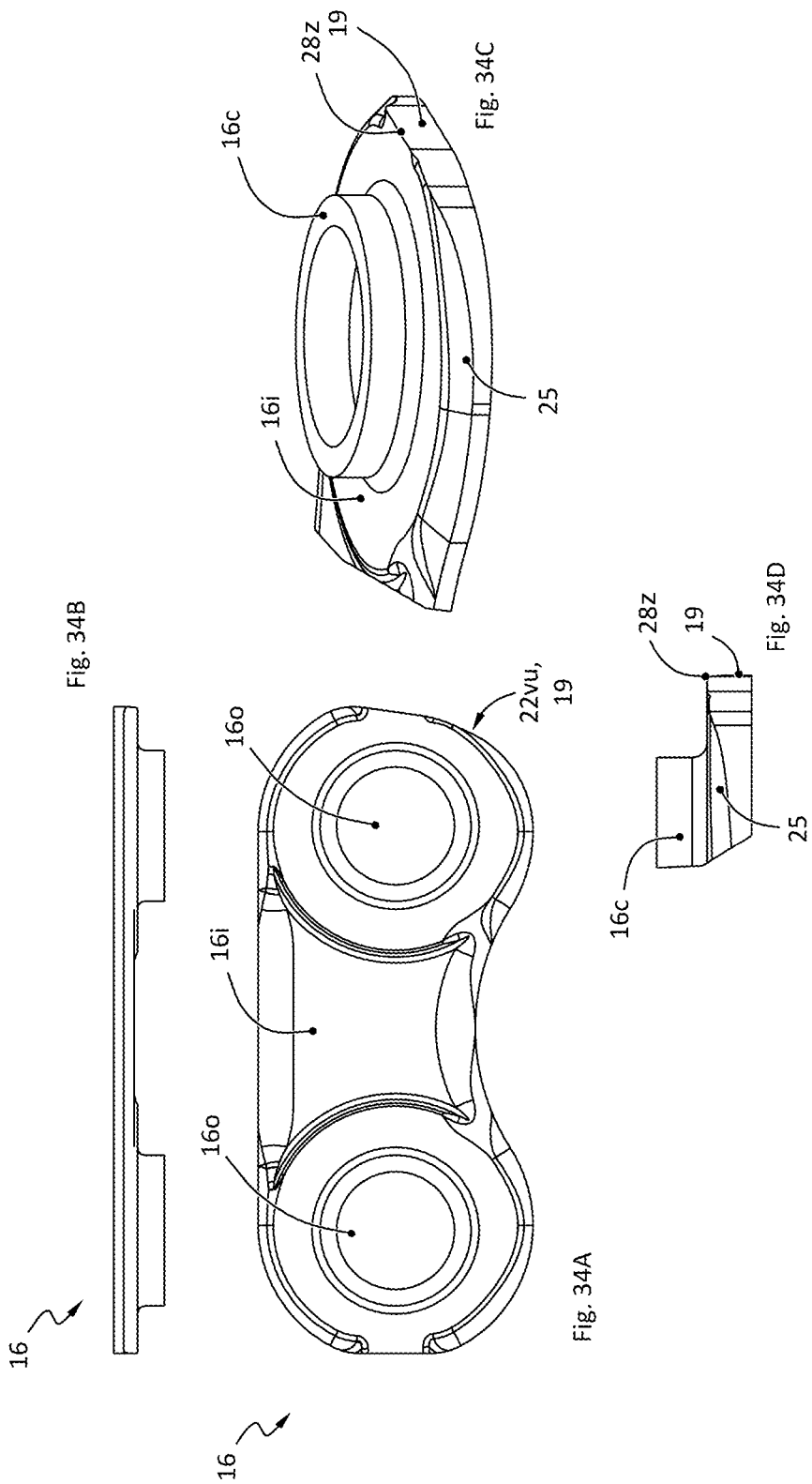

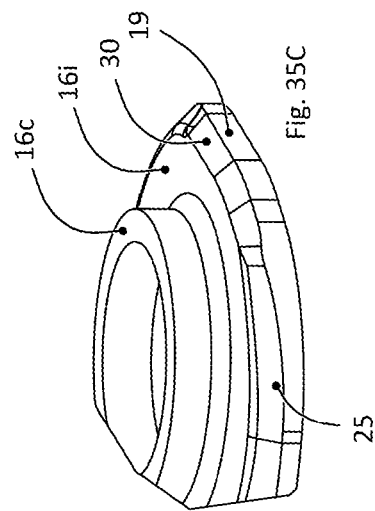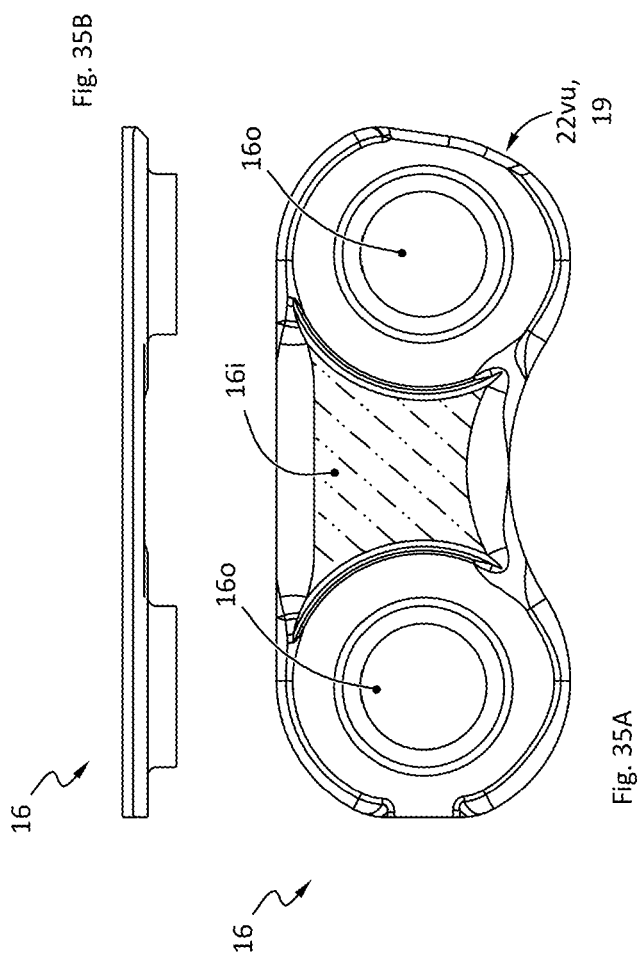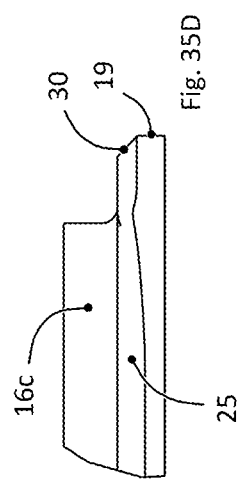

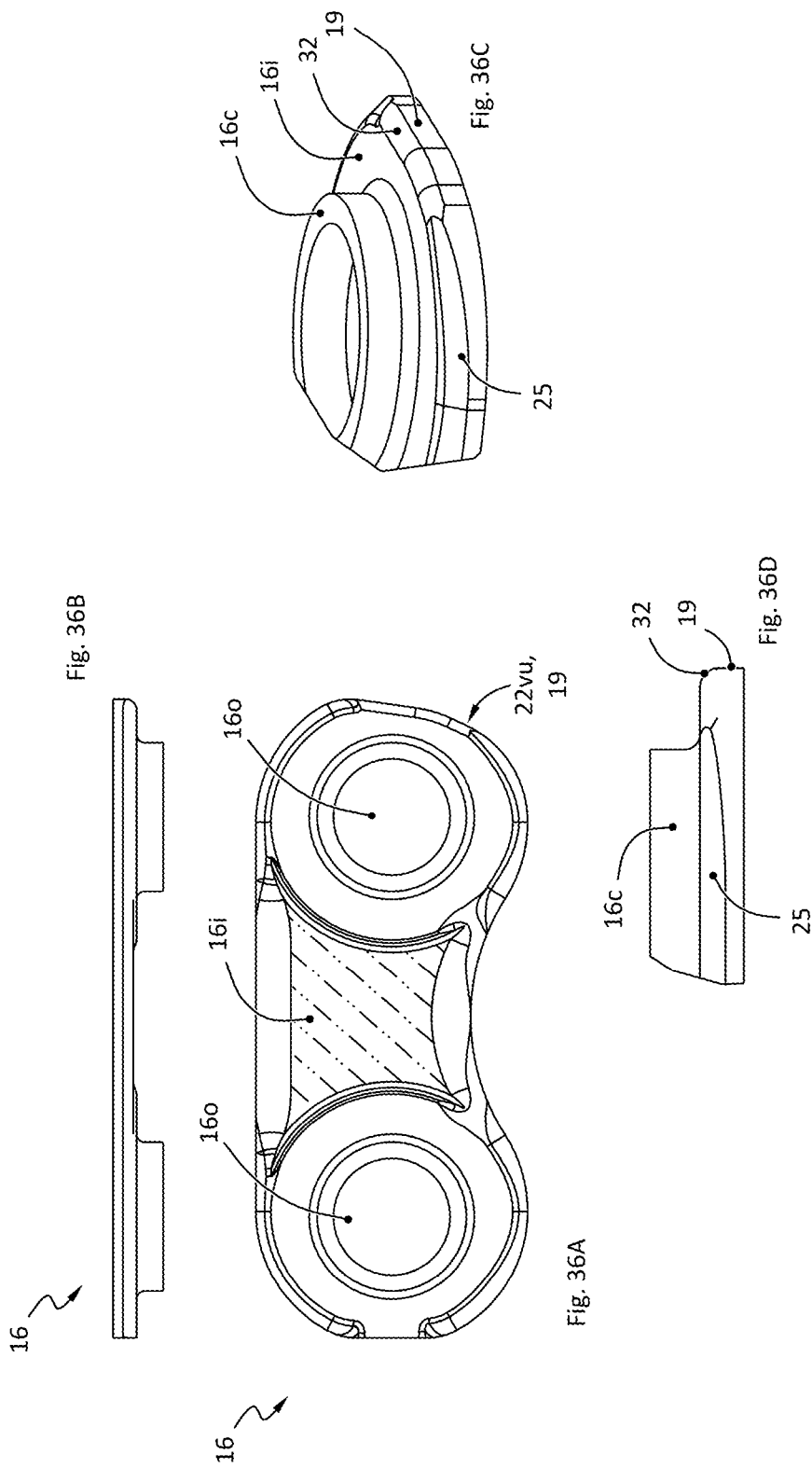

BICYCLE CHAIN

This application claims the benefit of DE 10 2019 006 974.9, filed on Oct. 8, 2019 and DE 10 2020 211 481.1, filed on Sep. 14, 2020.

FIELD OF THE INVENTION

The present invention relates to a roller chain for bicycles, in which certain shifting problems occurring during the shifting at the sprocket cassette on the rear wheel from a larger sprocket to a respectively adjacent smaller sprocket are avoided.

BACKGROUND

A bicycle can be provided with a drive arrangement, such as, for example, a chain drive. Bicycle drive arrangements can be used to transfer the torque from a cyclist to a rear running wheel in order to drive the bicycle. A drive arrangement can, for example, transfer the torque from a front sprocket arrangement via a chain to a rear sprocket, for example a sprocket of what is referred to as a sprocket cassette or of what is referred to as a sprocket set, in order to drive a rear running wheel. Such a drive arrangement may be referred to as a drive train.

Sprocket assemblies for bicycles can have one sprocket or a plurality of individual sprockets. The front sprockets are generally referred to as chain rings. Chain rings can be fastened by means of various fastening devices. A chain ring can, for example, be fastened with chain ring screws or mounted directly on the crank of a bicycle. The rear sprockets are frequently referred to as sprockets. A plurality of rear sprockets or sprockets may be referred to as a cassette, sprocket cassette or sprocket set. Such a cassette is typically configured in such a manner that it can be fastened to a freewheeling part of a rear running wheel.

SUMMARY AND DESCRIPTION

In embodiments, a drive arrangement, chain and/or an inner link plate for a bicycle chain having chain rollers is provided. A protrusion of the inner link plate in relation to the respectively assigned chain roller in a front lower longitudinal end region of an inner link plate outer periphery is reduced, in comparison to the protrusion in a front upper longitudinal end region and/or in a rear lower longitudinal end region of the inner link plate outer periphery.

BRIEF DESCRIPTION OF THE DRAWING

Figures are described below that serve to explain exemplary embodiments of the invention.

FIGS. 2A to 2B illustrate a bicycle chain as used with sprockets;
FIGS. 3 to 5 illustrate prior art chain plates;
FIGS. 6 to 8 illustrate plates for a bicycle chain according to an embodiment;
FIGS. 11A to 11B illustrate a link for a bicycle chain according to an embodiment;
FIGS. 18 to 19 illustrate an embodiment of a bicycle chain;
FIGS. 20 to 22 illustrate prior art chain;
FIGS. 23 to 25 illustrate an embodiment of a bicycle chain;
FIGS. 26 to 27 illustrate prior art chain;
FIGS. 28 to 29 illustrate an embodiment of a bicycle chain;
FIGS. 34A to 34D illustrate an embodiment of a bicycle chain plate;
FIGS. 35A to 35D illustrate an embodiment of a bicycle chain plate;
and
FIGS. 36A to 36D illustrate an embodiment of a bicycle chain plate.

DETAILED DESCRIPTION

Figure 1:
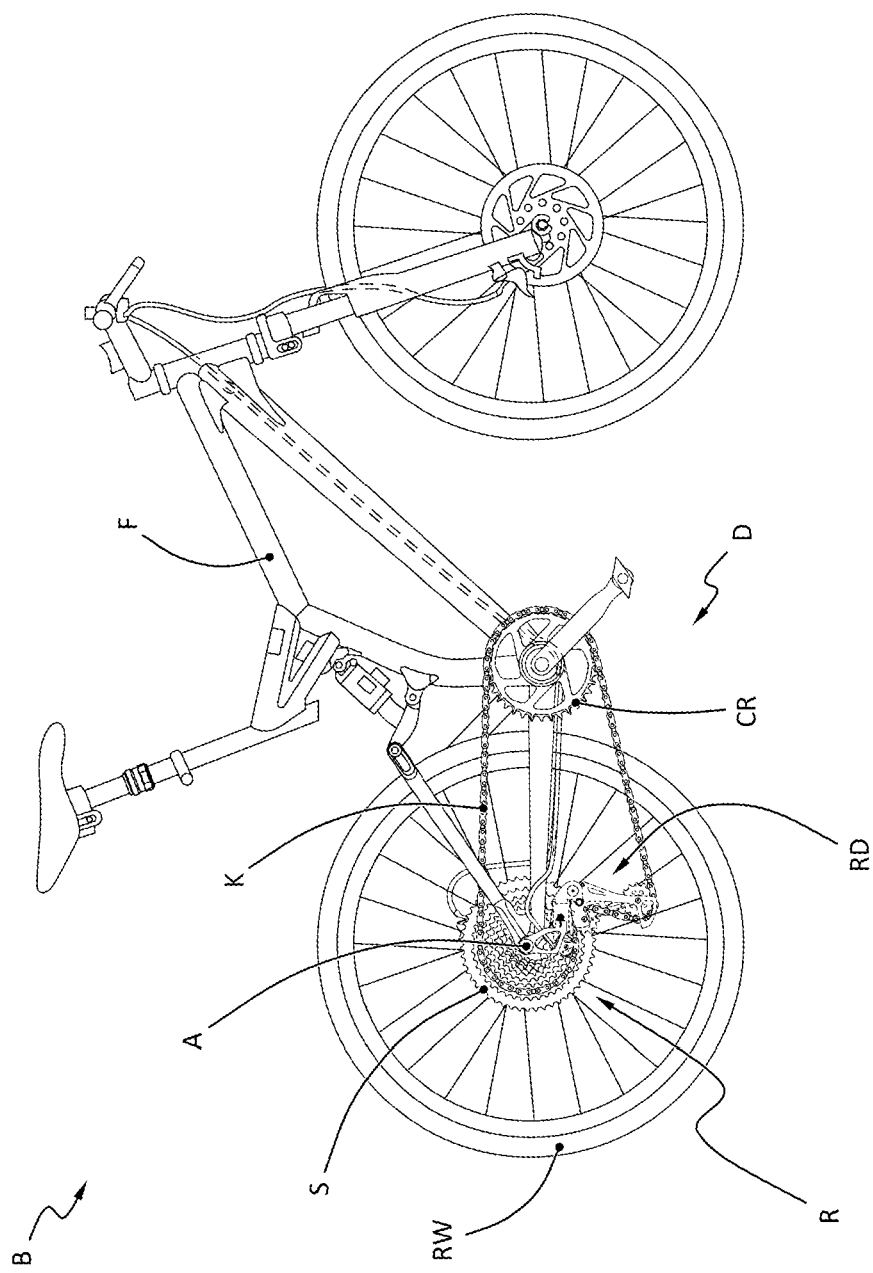
FIG. 1 shows a schematic illustration of an exemplary bicycle for implementing the invention.

The present invention relates to a roller chain for bicycles, in which certain shifting problems occurring during the shifting at the sprocket cassette on the rear wheel from a larger sprocket to a respectively adjacent smaller sprocket (also referred to as a sprocket) are avoided. The aforementioned shifting operation is also referred to as outboard shifting. Furthermore, the present invention also relates to an inner link plate for such a roller chain, to a drive arrangement having at least two adjacent sprockets and a bicycle chain, and to a bicycle drive system.

Position or direction details, such as "left", "right", "front", "rear", "top", "bottom", etc. used in the description below of the invention and also partly in the associated figures correspond to the cyclist's perspective on a bicycle. With regard to a bicycle chain or the components thereof, the position or direction details used in the application refer to the upper strand of the bicycle chain when mounted on the bicycle.

value Roller chains as drive chains, which are known from the prior art, for bicycles with a derailleur are conventionally assembled from chain links which are arranged pivotably with respect to one another and from which a closed chain strand is formed for transmitting the driving force.

In each case one pair of inner link plates or outer link plates forms an inner link plate or an outer link plate chain link (cf. FIGS. 26/27). The link plates each have two end regions with a conventionally rounded outer contour, wherein the end regions are connected via a connecting region having a generally tapered outer contour (cf. FIGS. 3 to 5). Punched holes are provided in the end regions of the link plates, conventionally concentrically with respect to the rounded outer contour (cf. FIG. 9).

Friction Ratios Upon Contact of Chain Roller and Tooth on the Sprocket

The alternatingly arranged inner link plate and outer link plate chain links are connected pivotably to one another at the chain joints by means of chain pins (also referred to as chain rivets) (cf. FIGS. 26/27). The chain pins are pressed here into the punched holes in the outer link plates (cf. FIG. 27), while play is in each case present between the punched holes in the inner link plates and the chain pins (cf. FIGS. 11A/B) in order thereby to permit the rotatability between the chain links.

The inner link plates conventionally have collars on their inner side in the region of the punched holes (cf. FIG. 9), wherein a chain roller is in each case arranged rotatably on a pair of collars arranged in a mirror-inverted manner with respect to one another (cf. FIGS. 11A/B).

Friction Ratios at the Chain Roller by Means of a Rubbing Relative Movement and by Means of Rolling During Normal Chain Engagement without a Shifting Operation Such an arrangement of rotatable chain rollers is a prerequisite for favorable friction ratios between chain roller and sprocket tooth, especially during the operation of the chain coming into engagement at the sprocket teeth during the driving operation of the chain (cf. FIGS. 12 to 15 and 30 to 33). During this operation, the chain rollers roll on the outer contour of the teeth in each case coming newly into engagement. The force flux between chain link and sprocket tooth runs here through contact points, both between the cylindrical outer surface of the roller and the load flank on the sprocket tooth (cf. FIG. 15) and between the cylindrical inner surface of the roller and the collar (cf. FIGS. 9 to 11B) of the inner link plate.

At the contact point between collar and roller there are generally good lubrication ratios, and extensive contact surfaces are located between said two elements that are in contact there.

At the contact point between the load flank on the sprocket tooth and the chain roller (cf. FIG. 15), the lubrication ratios are conventionally substantially poorer, and there is no extensive contact there. On the other hand, rather than a sliding relative movement between roller and tooth flank, there is also a substantially predominantly rolling relative movement between them there. The friction is thus also kept within limits there.

Engagement Operations and Guide Function of the Chain Link Plates

The interspaces between the link plate pairs of the chain link plates (cf. FIG. 26) constitute passages for the teeth of the sprockets. Said passages are provided for the purpose of the teeth of the sprockets securely engaging therein and thus for the chain to be prevented from jumping off the sprockets.

This engagement operation takes place both in the driving situation (cf. FIGS. 2a and 2b, 12 to 15 and 30 to 33) in which the chain comes into engagement again and again with the teeth on a single rotating sprocket and also during the transfer of the chain from one sprocket to the adjacent sprocket for the purpose of gear changing (cf. FIGS. 16 to 25).

Skewed running of the chain frequently occurs not only during the transfer of the chain, but also in the driving situation. In the driving situation, skewed running occurs whenever the sprockets involved are not aligned, that is to say when they do not lie in a plane, which is the predominant normal situation in the case of bicycles having a derailleur. Secure engagement of the teeth of the sprocket in the interspaces of the chain also has to occur under these conditions in order to avoid the chain jumping off.

By contrast, a shifting operation signifies an actively controlled transfer of the chain from the smaller sprocket to the larger sprocket (inboard shifting) or transfer of the chain from the larger to the smaller sprocket (outboard shifting).

Chamfers for Facilitating Engagement

In order to carry out the above-described engagement and guide functions under as far as possible all conditions, including even in the event of skewed running, there is the endeavor to configure the interspaces between the link plate pairs to be as large as possible in a direction perpendicular to the inner side of the link plates (=transverse direction of the chain=axis of rotation of the sprockets) (cf. FIGS. 2A, 20 and 26). At the inner link plates of the chain that are more closely side by side, the already-discussed chamfers in the region of the outer contours of the inner link plates (cf. FIGS. 9 and 11B) help to provide a widened inlet funnel for the sprocket teeth tips entering the interspaces.

In terms of their complex configuration, chamfers on chain link plates of bicycle chains already in the prior art go significantly beyond what is conventionally understood under the term of "chamfer" (conventionally at an angle of 45 degrees, for example for obtaining a sharp edge on a solid part or on a sheet-metal part).

Discussion of the Inner Link Plate Protrusion (Longitudinal and Transverse Protrusion)

If the inner link plates protrude in relation to the chain rollers (cf., for example, FIGS. 11A/B and 13), said inner link plate protrusion takes on a guide function for the chain when the latter is in engagement with the sprocket or sprocket. A protrusion of the inner link plate outer contour in the longitudinal direction of the chain (longitudinal protrusion) reaches into the space between a pair of outer link plates (cf. FIG. 26). Said longitudinal protrusion becomes effective (cf. FIGS. 12/13) when the sprocket tooth enters the outer link plate interspace and the chain roller comes ever closer to the tooth flank. A pronounced longitudinal protrusion is shown, for example, in DE10127139A1, see FIGS. 1 and 3 there.

A protrusion in the transverse direction of the chain (transverse protrusion, cf., for example, FIGS. 5, 11A and 13) can take on a guide function only when the chain roller has already entered to a great extent into the tooth gap. This aspect is made the subject of the discussion in DE102008031162A1, cf. paragraph [0017] there and FIGS. 1 and 4.

Chamfers on the Inner Link Plate Protrusion

As a result of the different requirements regarding longitudinal and transverse protrusions, these are used in mutually differing configurations. In DE102017009632A1, chamfers having differing inclinations are shown on the inner link plate protrusion in the longitudinal and transverse direction (see, for example, FIG. 3 there).

Similarly as for the inner link plate, it is generally also true of the inner link plate protrusion in particular that the inlet funnel for the tooth tips is widened with the arrangement of chamfers (cf. FIGS. 11A/B). The certainty of the tooth tips entering as directly as possible into the link plate interspace under all operating conditions and of the chain not riding up on the tooth tips is therefore increased.

Conditions for the Shifting onto the Larger Sprocket (Inboard Shifting) or onto the Smaller Sprocket (Outboard Shifting)

So that a bicycle chain can be transferred between adjacent sprockets, it has to be shifted by means of a corresponding chain guide device (at a front derailleur in the region of the bottom bracket or at a rear gearshift mechanism in the region of the rear axle) in the lateral direction parallel to the axis of rotation of the sprocket or perpendicularly to the plane of extent of the sprocket in order thus first of all to disengage the chain from the teeth of the sprocket being left.

So that the chain can subsequently come into engagement smoothly and easily on the adjacent sprocket, the shifting of the chain has to take place where possible at a certain structurally defined rotation angle position of the sprockets relative to the chain. This applies in particular whenever the sprockets at defined locations along their circumference have corresponding shift features, i.e., for example, projections and/or recesses, which are intended to facilitate the transfer of the chain between adjacent sprockets.

In the event of shifting to the adjacent larger sprocket or sprocket (inboard shifting), conventionally shift features within the context of recesses are provided on the larger sprocket or sprocket in order thereby to create space and optionally also receiving projections for the chain links of the chain portion running over them, in particular for the laterally protruding outer link plates of the chain.

In the event of the shifting to the adjacent smaller sprocket (outboard shifting, cf. FIGS. 16 to 25), the chain is disengaged from the larger sprocket because of the action of the chain guide device (here the rear derailleur which is arranged in the return strand of the chain and is not illustrated in the figures) while a driving engagement of the outgoing chain portion with the larger sprocket still continues to take place (cf. FIGS. 16 to 19).

In this case, there has to be in particular a sufficient degree of lateral movability of the chain in relation to the teeth (cf. FIGS. 20 and 23—where the lateral movability illustrated there of the chain is merely indicated schematically since this in actuality corresponds more to a gradual, curved transition with the involvement of a plurality of chain links).

Said lateral movability of the chain, in particular when a transverse and also longitudinal protrusion of the inner link plate links is present (as described further above, cf. in particular FIG. 13) and when there is a corresponding ratio of the thickness of the teeth in the transverse direction to the clear width between the chain inner link plates, can be restricted at least for as long as the chain is still in engagement with the sprocket being left.

The effect of the reduced lateral movability of the chain in relation to the teeth in conjunction with the transfer of the chain to the adjacent sprocket only at predetermined locations with corresponding shift features or shift aids is discussed, for example, in DE102008031162A1, cf. for example, paragraph [0007] there.

Outboard Shifting Procedure

In the case of the outboard shifting (i.e. when shifting from the larger to the adjacent smaller sprocket), first of all a certain inner link plate chain link passes a certain tooth of the larger sprocket on the side (outboard side) thereof facing the smaller sprocket, cf. at "b" in FIGS. 16 to 25.

Subsequently, a tooth of the smaller sprocket, said tooth following in the direction of rotation of the sprocket, enters into the link plate interspace of a chain link of the overrunning chain portion (cf. at "c" in FIGS. 16 to 25). In the illustrated exemplary embodiment or gear step, this is an outer link plate chain link; in the case of other differences in teeth numbers or sprocket sizes, it may also be an inner link plate chain link.

This operation is associated with bending of the overrunning chain portion radially inwards about a certain point of articulation or chain rivet of the last outer link plate chain link still in engagement with the larger sprocket counter to the direction of rotation (at "a" in FIGS. 16 to 25).

Figures 16, 17:
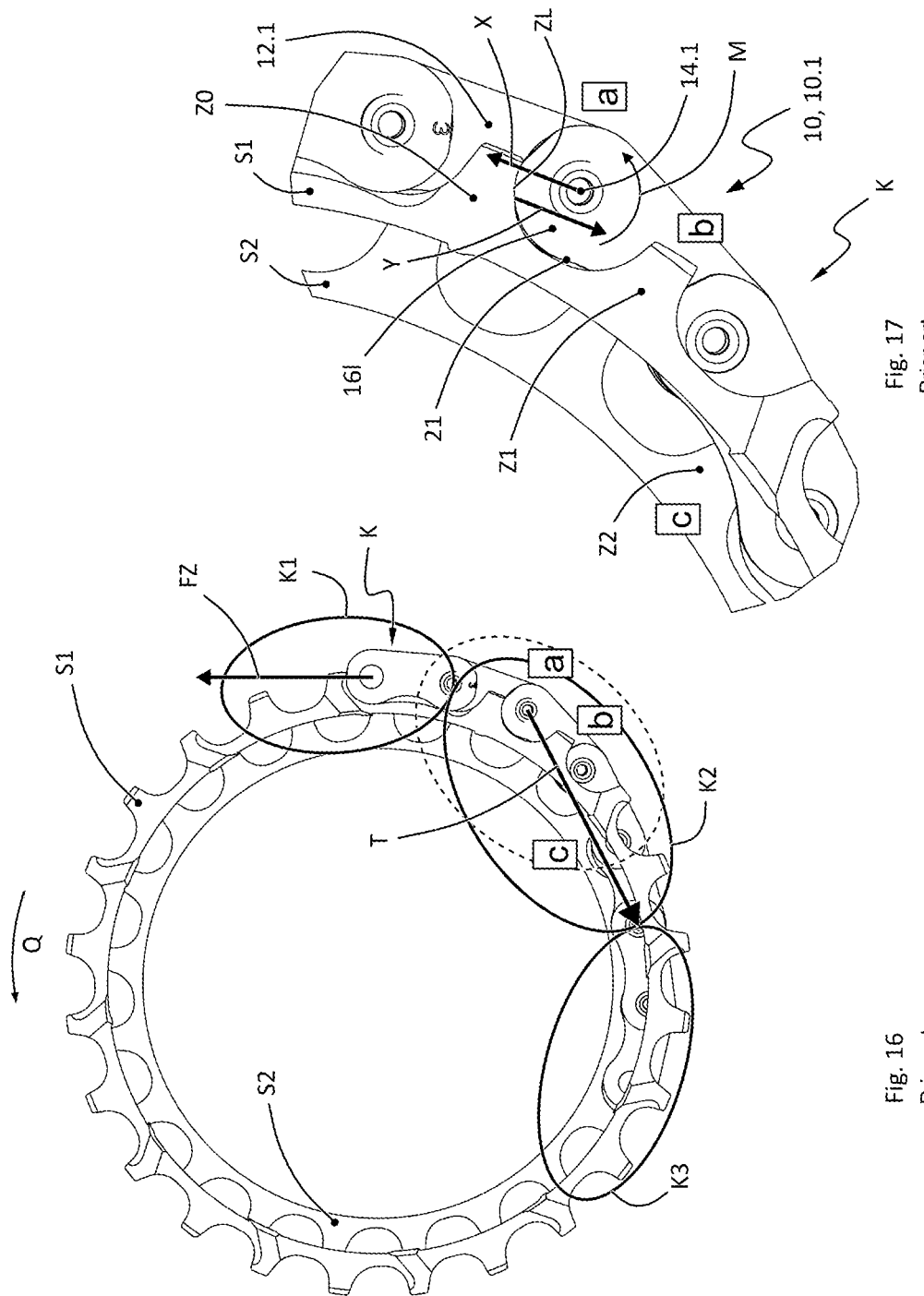
FIGS. 16 to 17 illustrate prior art chain.
Figure 31:
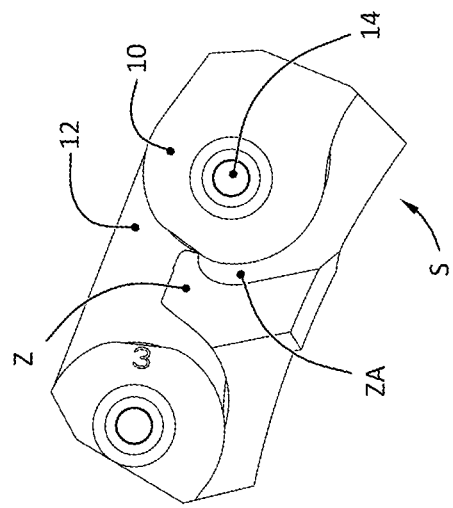
FIGS. 30 to 31 illustrate prior art chain.

This bending movement of the chain during the transfer onto the smaller sprocket is therefore linked to a rotation of the associated inner link plate link ("b" in FIGS. 16 to 25) in relation to the preceding outer link plate chain link that is still in engagement on the larger sprocket ("a" in FIGS. 16 to 25) and with a corresponding movement of the periphery of the rounded outer contour of the left bending inner link plate relative to the adjacent tooth load flank (cf. FIGS. 17, 19 and 24).

If the periphery of the outer contour of the bending inner link plate lies here against said tooth load flank, which is the case in the prior art (cf. FIG. 17), then at this point—unlike in the case of contact between chain roller and tooth of the sprocket, where a low-friction rolling operation of the chain roller on the flank of the tooth takes place—sliding friction occurs which obstructs the pivoting movement of the bending inner link plate chain link ("b" in FIG. 17) and therefore the shifting operation.

In addition to the friction arising at this point in the prior art, a torque "M" may also occur depending on the geometry of the load flank of the last sprocket tooth of the larger sprocket emerging from the outgoing chain portion (cf. FIG. 17), which torque can be formed from the chain tensile force X and from the counterforce Y which is eccentric thereto (depending on the geometry) and is transmitted from the load flank ZL to the outer contour of the inner link plate.

This torque therefore attempts to prevent the bending chain link ("b" in FIG. 17) from bending and instead to stretch the overrunning chain portion (cf. FIG. 16).

A further effect of the front periphery of the left inner link plate of the bending inner link plate chain link (cf. FIGS. 17, 20 and 22), said front periphery colliding in the prior art with the load flank of the last emerging sprocket tooth, is that not only is the desired frictionless bending movement of said inner link plate chain link thereby disturbed, but so too is the lateral shifting, which already begins prior to said bending movement, of the overrunning chain portion (cf. FIGS. 20/22), by the shifting mechanism, by means of which the outboard shifting is initiated.

These frictional forces and reaction torques occurring in the contact region between the outer periphery of the inner link plate of the bending chain link "b" with the last emerging sprocket tooth of the larger sprocket are critical in particular whenever what is referred to as the "tangential condition" during the outboard shifting is to be particularly readily met, which is desirable.

"Tangential condition particularly readily met" means that the chain portion running over between the sprockets (cf. FIGS. 16 and 20) as closely as possible represents a theoretical tangent to the smaller sprocket, starting from the incoming chain portion, which is already engaging in the smaller sprocket, towards the outgoing chain portion that is still in engagement with the larger sprocket (cf. FIG. 16).

By means of diverse shift features at precisely defined locations and by means of a relative rotation angle position, coordinated precisely with the shift features, between respectively adjacent sprockets, sprocket arrangements or sprocket sets are nowadays configured in such a manner that the chain rollers of the chain during shift-feature-assisted outboard shifting and when the tangential condition is met enter precisely into the interspaces between the teeth of the smaller sprocket or sprocket without coming into contact with the tooth tips thereof or even riding up thereon.

Said endeavored meeting of the tangential condition thus leads in the travel mode to what is referred to as the gear-shifting jolt that occurs during the shifting correspondingly turning out to be small or even being eliminated. In other words, when the tangential condition is ideally met, the chain portion running over between the sprockets during the shifting operation is completely stretched and at the same time the outcoming and incoming chain portions adjoining the overrunning chain portion in both directions both engage simultaneously in a force-transmitting manner in the larger and smaller sprocket, and therefore, even during the shifting operation, no interruption to the torque whatsoever takes place.

In yet other words, a shifting operation with an ideally met tangential condition of the overrunning chain portion signifies a more or less virtually silent shifting operation which is also jolt-free in the driving direction, and therefore represents the ideal being sought.

Since, however, during the outboard shifting operation, as described above, even small friction forces or other interfering forces, such as, for example, also the possibly arising torques "M", the skewed running and the sought tangential course of the overrunning chain portion may have an interfering effect and thus may be uncontrollably extended, great importance is attached to avoiding said interfering influences. This is because if said interfering influences result in an inadvertent deviation of the chain travel from the above-described sought course in the region of the overrunning chain portion, this may lead to the incoming chain portion (cf. FIG. 16) to the smaller sprocket riding up on the tooth tips and, during the further course of the shifting operation, to one tooth or even a plurality of teeth of the smaller sprocket then jumping over there.

This in turn leads at the end of the shifting operation to an abrupt jumping forwards of the outgoing chain portion, of the overrunning chain portion and of the incoming chain portion, and therefore also of the entire chain load span, which is optionally under a high tensile stress, by the same amount. This is not only annoying for the cyclist and dangerous under some circumstances, for example due to the associated slipping from the pedal, but also loads the entire drive train in a manner which is not envisaged and therefore is potentially damaging or impairs the service life.

Identification of Cause-Effect Relationships

The applicant is of the opinion that here the identification of the cause-effect relationships in relation to outboard shifting errors that have for a long time not been understood already makes up a crucial part of the inventive step.

This is apparent not least by the detailed analysis above of the prior art with its disadvantages. In particular, this applies to the problem which is present in the prior art and is set forth above, according to which the bending inner link plate chain link "b" of the overrunning chain portion is prevented from its pivoting movement about the chain rivet since the front periphery of the left inner link plate of said chain link lies and rubs against the load flank of the last emerging sprocket tooth of the larger sprocket.

As described, in addition to said undesired friction, it is even possible for torques to arise which extend the bending inner link plate chain link counter to its bending movement and therefore interfere with or make impossible the tangential entry, which was required for jolt-free shifting, of the overrunning chain portion into the toothing of the small sprocket. Furthermore, the collision of the front periphery of the left inner link plate of the bending chain link also already interferes with the lateral skewed running of the overrunning chain portion, which initiates the shifting operation.

The problem described in detail above is provided without modification in the prior art. This is because the above-described effects and causes for the shifting errors occurring under load during outboard shifting, particularly the shifting jolt due to the jumping by the outgoing chain portion over sprocket teeth, have hitherto remained unknown despite multiple analyses.

This is because, when shifting operations towards the smaller adjacent sprocket have been examined and analyzed, in spite of the sprocket geometry already being refined to a high degree in the prior art, shifting errors continue to be observed, in particular under load, which are expressed in the above-described jumping of the chain and for which there has been no explanation.

Therefore, in the applicant's opinion, inventive quality is already attached to the identification and depiction of the effects and reasons for said shifting errors, as a requirement for the objective of the present invention.

OBJECT OF THE INVENTION

Against this background, it is the object of the present invention to overcome the above-described disadvantages which are present in the prior art and therefore to further improve the outboard shifting, particularly under load. The applicant has identified that, for this purpose, in particular a rubbing and pressing contact, which transmits normal force, between the front left or inboard-side longitudinal periphery of the bending inner link plate, on the one hand, and the load flank of the last emerging sprocket tooth of the larger sprocket, on the other hand, has to be avoided.

As illustrated in detail above, the applicant within the context of discovering a previously unidentified object gained the finding that said rubbing or pressing contact, or in general the collision between the left front inner link plate protrusion and the load flank on the last emerging tooth of the larger sprocket is one of the main causes for shifting errors during outboard shifting still remaining in the prior art.

The inventive objective has been formulated therefrom of preventing the rubbing or pressing contact between inner link plate and tooth in order thereby to reproducibly ensure the sought tangential condition of the overrunning chain portion during outboard shifting even under load.

Solution According to the Invention

This objective which is not previously known in the prior art and is therefore inventive has been achieved in a likewise inventive manner in that the front protrusion of the left or inboard-side chain inner link plate is recessed in a defined manner in a certain region in which it is not required for the chain guide functions described further above (cf. in particular FIGS. 6 to 8, 10 to 11B and 25), namely at least in a front lower longitudinal end portion of the inner link plate outer periphery. This certain region is selected in such a manner that, when the inner link plate is installed in a bicycle chain on a bicycle, said region, during the outboard shifting from a larger sprocket to an adjacent smaller sprocket, then lies opposite the load flank of a sprocket tooth of the larger sprocket, said sprocket tooth emerging last from an outgoing chain portion during the shifting operation.

Said specific partial recessing of the front left or inboard-side inner link plate protrusion avoids the situation in which said inner link plate protrusion, as described above, obstructs the initiating lateral movement of the overrunning chain portion and the bending movement of the inner link plate chain link during the outboard shifting by means of pressing or rubbing contact with the aforementioned load flank, or even counteracts said bending movement by forming a torque (cf. in particular FIGS. 17 and 20/22).

The solution according to the invention is also distinguished in that it is independent of specific operating conditions, such as, for example, of the chain tensile force in the tension strand of the chain, and furthermore of parameters in the configuration of the toothing, such as number of teeth, radial depth of the tooth root, i.e. of the tooth interspace between two teeth that are adjacent in the circumferential direction, and also in particular on the degree of wear at the load flanks of the teeth.

According to the invention, it is provided that the protrusion of the inner link plate in relation to the respectively assigned chain roller in a front lower longitudinal end region of the inner link plate outer periphery is reduced, and is preferably negative at least in regions, in comparison to the protrusion in a front upper longitudinal end region or/and in a rear lower longitudinal end region of the inner link plate outer periphery. The outer contour of the inner link plate can therefore be set back in particular only at a single point or in a single region, namely only precisely in the region in which otherwise, during outboard shifting, undesired friction contact between the load flank of the sprocket tooth emerging last during the switching operation and the inboard-side inner link plate would occur.

A term such as "front lower longitudinal end region" should be understood here as meaning a lower part or portion of the front longitudinal end region of the inner link plate, wherein direction details, as mentioned in the introduction, relate to the upper strand of the bicycle chain when mounted on the bicycle. Accordingly, a front upper longitudinal end region is an upper part or portion of the front longitudinal end region, and a rear upper or lower longitudinal end region is an upper or lower part or portion of the rear longitudinal end region. "Negative longitudinal protrusion" means that the chain roller protrudes in the respective region over the inner link plate in a side view. The "associated" chain roller for the front longitudinal end region is the front chain roller, and, for the rear longitudinal end region, is the rear chain roller of a chain link.

In order to be able to install the inner link plate in a chain in two different orientations arising by rotation by 180°, the protrusion of the inner link plate in relation to the respectively assigned chain roller furthermore also in a rear upper longitudinal end region of the inner link plate outer periphery can be reduced, and can be preferably negative at least in regions, in comparison to the protrusion in a front upper longitudinal end region or/and a rear lower longitudinal end region of the inner link plate outer periphery.

The protrusion of the inner link plate outer periphery over the associated chain roller can be reduced or negative within an angular range of, for example approximately 45°, as is indicated in FIG. 6.

Furthermore, protection is claimed for a bicycle chain having alternatingly arranged inner link plate chain links and outer link plate chain links, which chain links are connected pivotably to one another by means of chain pins, wherein a chain roller is provided at each chain pin, and wherein the inner link plate chain links have inboard-side inner link plates according to the invention, such as have been previously described. In principle, it can be provided that, for each inner link plate chain link, only the protrusion of the inboard-side inner link plate in relation to the respectively assigned chain roller in a front lower longitudinal end region of the inner link plate outer periphery is reduced, and is preferably negative at least in regions, in comparison to the protrusion in a rear lower longitudinal end region of the inner link plate outer periphery of the inboard-side inner link plate and in comparison to the protrusion in a front lower longitudinal end region and in a rear lower longitudinal end region of the inner link plate outer periphery of the outboard-side inner link plate. This corresponds to a reduced protrusion only in the region "f" of the inner link plate chain link illustrated in FIG. 11.

In order to be able to mount the chain in two different running directions, it is also possible that, for each inner link plate chain link, the protrusion of the inboard-side inner link plate in relation to the respectively assigned chain roller in a front lower longitudinal end region of the inner link plate outer periphery of the inboard-side inner link plate is reduced, and is preferably negative at least in regions, in comparison to the protrusion in a rear lower longitudinal end region, and wherein the protrusion of the outboard-side inner link plate in a rear lower longitudinal end region of the inner link plate outer periphery is reduced, and is preferably negative at least in regions, in comparison to the protrusion in a front lower longitudinal end region of the outer periphery of the outboard-side inner link plate. This corresponds to a reduced protrusion only in the regions "f" and "d" of the inner link plate chain link illustrated in FIG. 11.

It is also possible, for example for production or design reasons, for each inner link plate chain link, the inboard-side inner link plate and the outboard-side inner link plate to each have a reduced front lower longitudinal protrusion and a reduced rear lower longitudinal protrusion, which longitudinal protrusions are reduced in comparison to the front upper longitudinal protrusion and to the rear upper longitudinal protrusion, which corresponds to a reduced protrusion in the regions "d", "e", "f" and "g" in FIG. 11.

In order to be able to use the chain in all possible installation directions, it can be provided, in particular in the case of a chain without asymmetry at the top/bottom that, for each inner link plate chain link, the protrusion of the inboard-side inner link plate in a front lower longitudinal end region and in a rear upper longitudinal end region of the inner link plate outer periphery is reduced, and is preferably negative at least in regions, in comparison to the protrusion in a front upper longitudinal end region and in a rear lower longitudinal end region of the inner link plate outer periphery of the inboard-side inner link plate, and that the protrusion of the outboard-side inner link plate in a front upper longitudinal end region and in a rear lower longitudinal end region is reduced, and is preferably negative at least in regions, in comparison to a protrusion in a front lower longitudinal end region and in a rear upper longitudinal end region of the inner link plate outer periphery of the outboard-side inner link plate. This corresponds to a reduced protrusion in the regions "f", "i", "d" and "k" of the inner link plate chain link illustrated in FIG. 11.

The chain link plates of the bicycle chain can have asymmetry at the top/bottom, i.e., in particular at the lower edge (facing the sprocket) a tapered outer contour between the longitudinal end regions and at the upper edge (facing away from the sprocket) a rectilinear outer contour between the longitudinal end regions.

Furthermore, protection is claimed for a drive arrangement for a bicycle, having a larger sprocket and an adjacent smaller sprocket and having a bicycle chain according to the invention as is described above, wherein, because of the regionally reduced longitudinal protrusion of the inboard-side inner link plates, during the outboard shifting the load flank of the last sprocket tooth of the larger sprocket to emerge from the outgoing chain portion does not come into contact with the outer periphery of the inboard-side inner link plate of the first bending inner link plate chain link.

It is particularly preferably provided here that a chain portion running over from the larger to the smaller sprocket during the outboard shifting at least approximately forms a tangent to the smaller sprocket.

Finally, protection is also claimed for a bicycle drive system comprising sprockets with an even number of teeth and with alternatingly thick and thin teeth and also a chain according to the invention or a drive arrangement according to the invention, such as has been previously described. The term "sprocket" can relate here both to the front sprocket or the front sprockets (if provided) and to the sprockets of the rear sprocket set.

The chain according to the invention can furthermore be used particularly advantageously in conjunction with sprockets with an even number of teeth which have thick and thin teeth arranged in an alternating manner, which is the subject matter, for example, of DE102015219522A1. In the case of such sprockets (also see FIGS. 20 and 23), the chain is guided not only at the inner link plate links, but also at the outer link plate links, into the link plate interspace of which the thick teeth enter.

The chain according to the invention can also be provided or combined in an advantageous manner with chain link plates which are asymmetric at the top/bottom. A chain having such asymmetric chain link plates is known, for example, from DE102017009632A1. Such a chain is basically mounted or used in such a manner that the tapered side of the chain faces radially towards the sprockets or sprockets while the non-tapered side of the chain faces radially outwards and away from the sprockets or sprockets.

With such a combination of the partial reduction according to the invention of the inner link plate outer contour with an asymmetric chain at the top/bottom, the protrusion can be left out in regions, for example (cf. FIG. 10) on the front lower tapered side of the chain inner link plate, which side faces the teeth of the sprockets (cf. FIG. 6), in order to avoid contact with the tooth load flank, while an inner link plate protrusion can continue to be provided on the upper side facing away from the teeth (cf. FIGS. 3 to 8), also in order to obtain there as large a material cross section as possible of the inner link plates and therefore a high load-bearing capacity or tensile strength of the chain.

The advantages of the chain according to the invention may also be combined in one embodiment, as above with chain link plates which are asymmetric at the top/bottom, in combination with sprockets having thick and thin teeth, as likewise described further above. In this case, there are still only very low requirements regarding the presence of an inner link plate protrusion for the purpose of guiding the chain on the teeth (cf. FIG. 13 and above under "Discussion of the inner link plate protrusion").

A further advantage of the chain according to the invention arises during the normal running of the chain without a shifting operation. Owing to the inner link plate longitudinal protrusion being partially recessed according to the invention, the recesses or milled grooves provided in the prior art on the left side of the sprockets for receiving the inner link plate longitudinal protrusion can be reduced (cf. FIGS. 30/31) or even omitted (cf. FIGS. 32/33).

By this means, the tooth strength is increased and the necessity of machining the sprockets during production is reduced. This advantage comes into effect not only in the case of multiple sprocket sets on the rear wheel, but also in the case of multiple and single sprockets in the region of the bottom bracket or on the pedal crank of a bicycle.

The details of the invention can be gathered from the above in conjunction with FIGS. 6 to 8, 10 to 11B, 14/15, 18/19, 23 to 25, 28/29 and 32/33, in each case in comparison to or in contrast with the illustratively corresponding FIGS. 3 to 5, 9, 12/13, 16/17, 20 to 22, 26/27 and 30/31 which show the situation of the figures mentioned first, but with a chain according to the prior art.

The essence of the invention is particularly clear from an overall view of FIGS. 17 and 19 and 22 and 25, together with the above explanations and the description below of the figures.

Furthermore, it is apparent, for example, from FIG. 11B in an overall view with FIGS. 28/29, that a chain according to an embodiment of the invention can also be formed to be at least partially symmetrical insofar as not only the left (inboard-side) inner link plate, but rather both inner link plates of each inner link plate chain link can have a reduced outer contour according to the invention in the region of a respective lower longitudinal protrusion (cf. FIGS. 3/6) of the inner link plate (at d and at f in FIGS. 11A/B).

Such a partially symmetrical design of the chain can be selected in order to be able to wind or use the chain in two opposed running directions. However, the advantages according to the invention are in principle also already achieved with a chain in which only the lower longitudinal protrusion (cf. FIG. 3) of the left chain inner link plate (at d in FIGS. 11A/B) has a reduced outer contour (cf. FIG. 25) while the three remaining lower longitudinal protrusions (at e, f and g in FIGS. 11A/B) of the two chain inner link plates can have an unchanged outer contour according to the prior art (cf. FIGS. 3 to 5).

It is likewise possible for all four lower longitudinal protrusions (at d, e, f and g in FIGS. 11A/B) of the two chain inner link plates to obtain a reduced outer contour according to the invention, for example for reasons in terms of production, load optimization or design. In this case, two of the regions with the reduced outer contour (at e and at f in FIGS. 11A/B) do not result in the effect according to the invention as described above and as apparent in particular in FIGS. 19 and 25, since said two outer contour regions e and g of the inner link plates—during the shifting at the rear wheel or on a bicycle sprocket cassette—never enter into position directly opposite the load flank of the last emerging sprocket tooth of the larger sprocket.

In particular in the case of a chain which is not asymmetric at the top/bottom (not depicted), it is also conceivable to provide a reduced inner link plate outer contour, apart from at d and f, also at i and k, or else in all eight regions d k according to FIG. 11A (wherein "k" in the illustration of FIG. 11A is partially concealed). In both cases, the advantage according to the invention is achieved independently of all possible installation directions of the chain.

The invention will be explained in more detail below with reference to exemplary embodiments which are shown in the figures and serve only as non-limiting examples.

Figure 9:
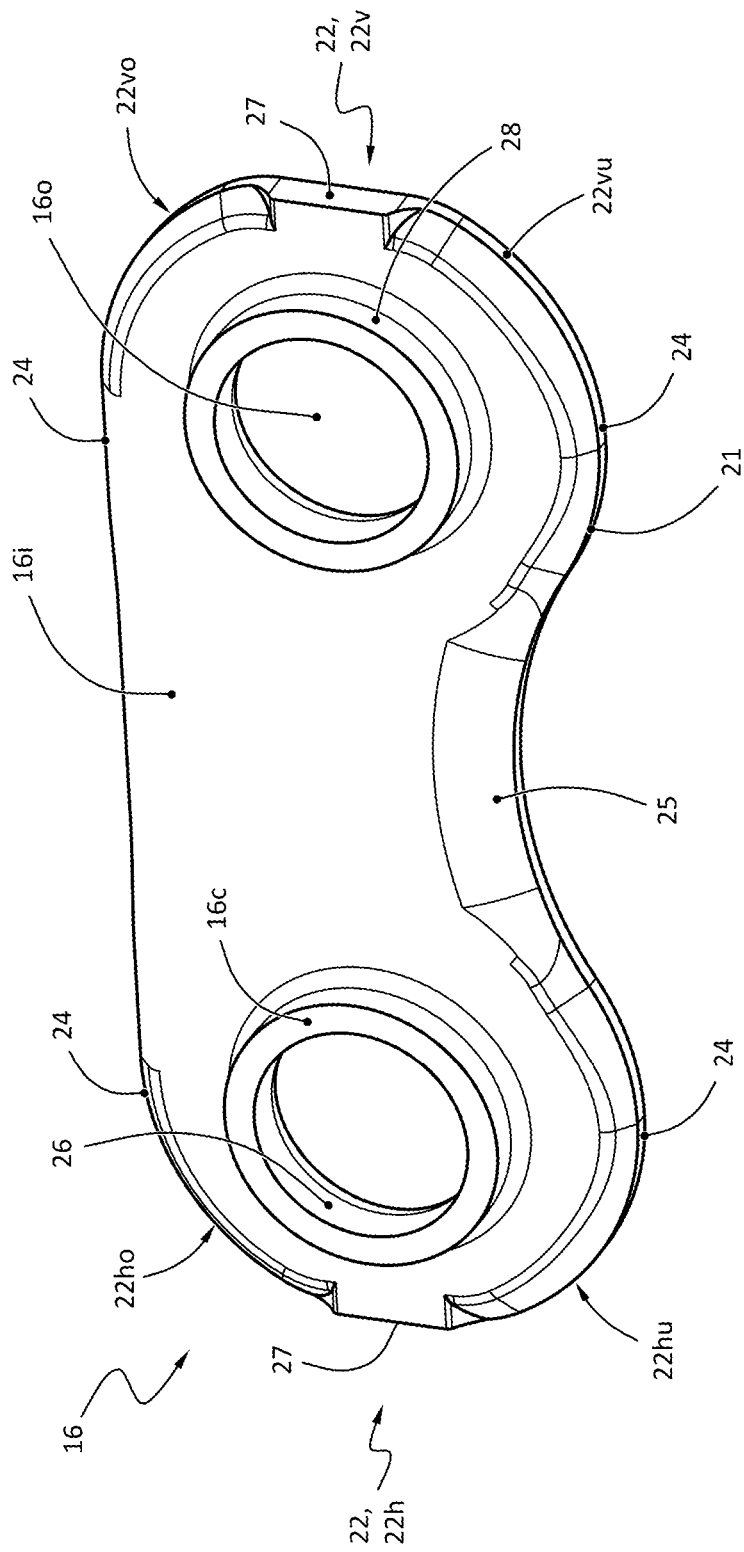
FIG. 9 illustrates a prior art chain plate.
Figure 10:
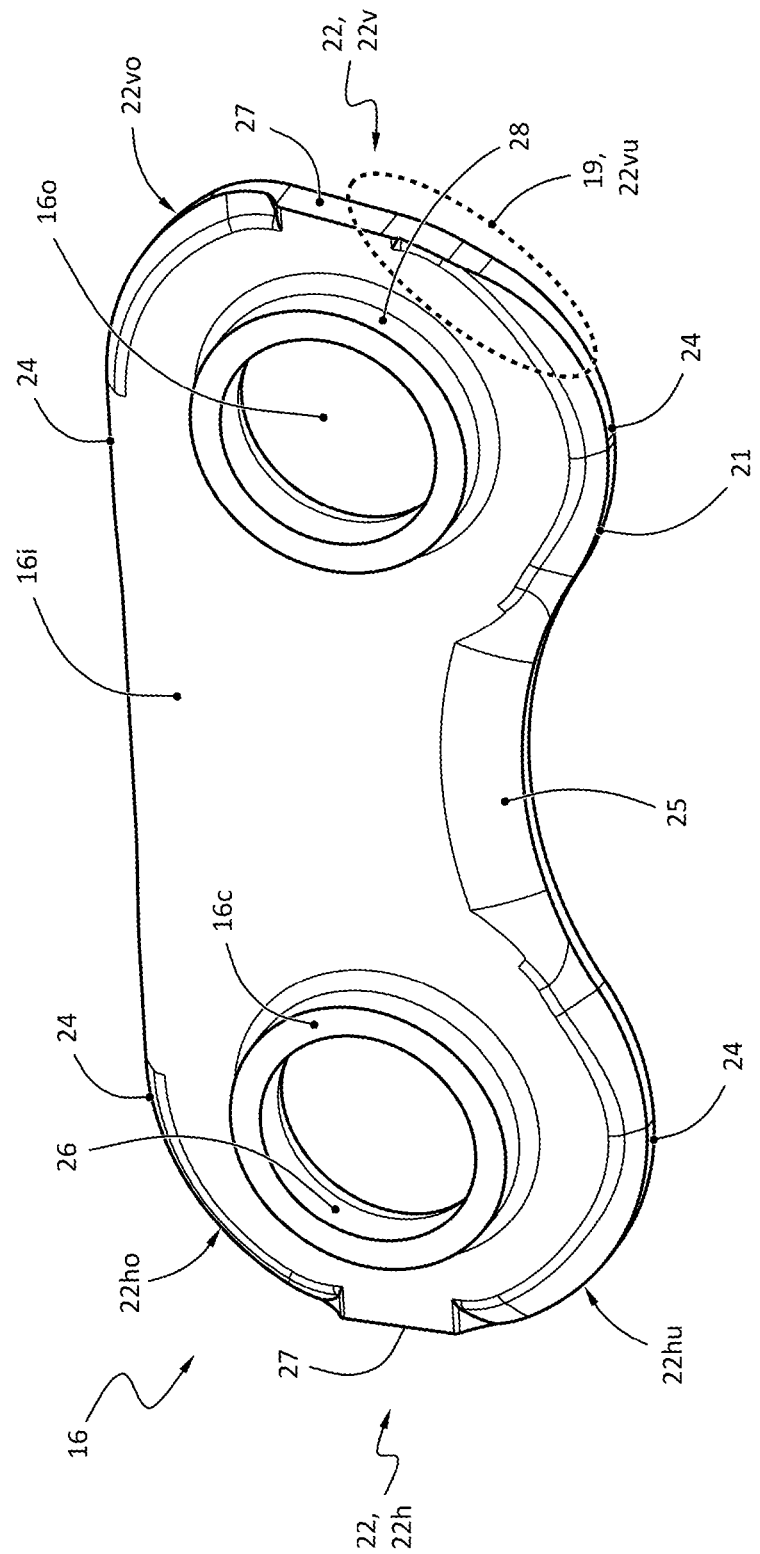
FIG. 10 illustrates a plate for a bicycle chain according to an embodiment.
Figure 12:
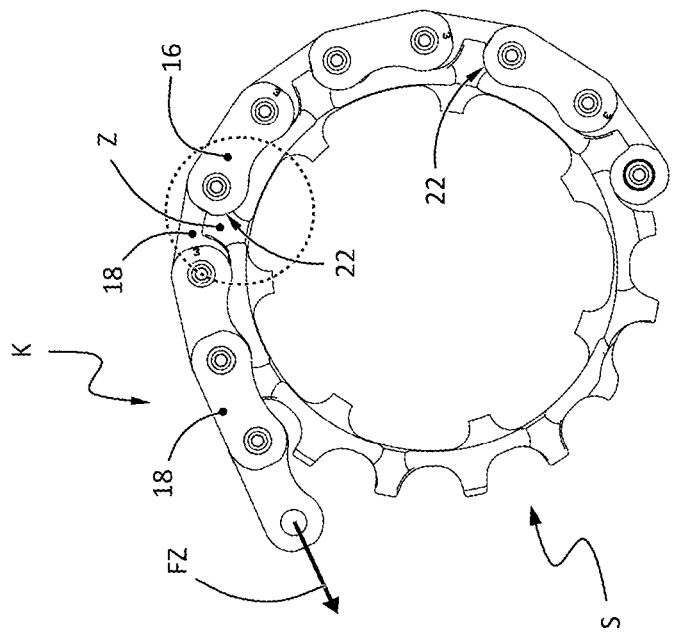
Figure 14:
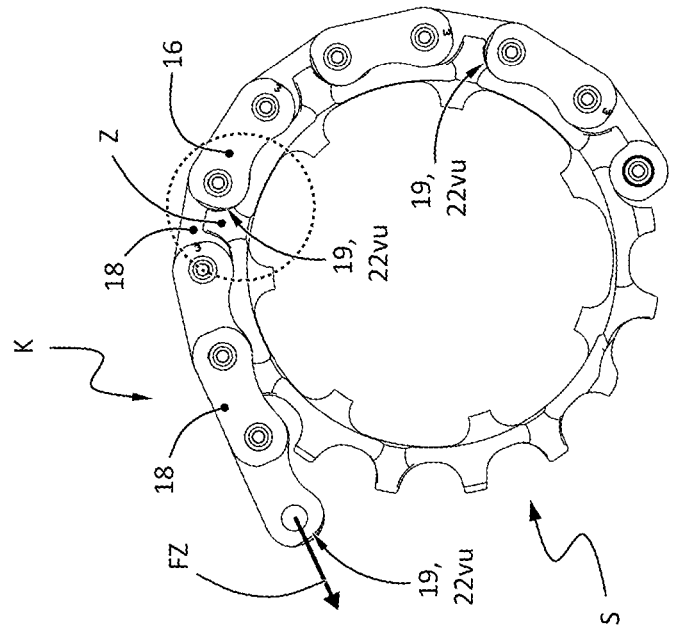
Figure 30:
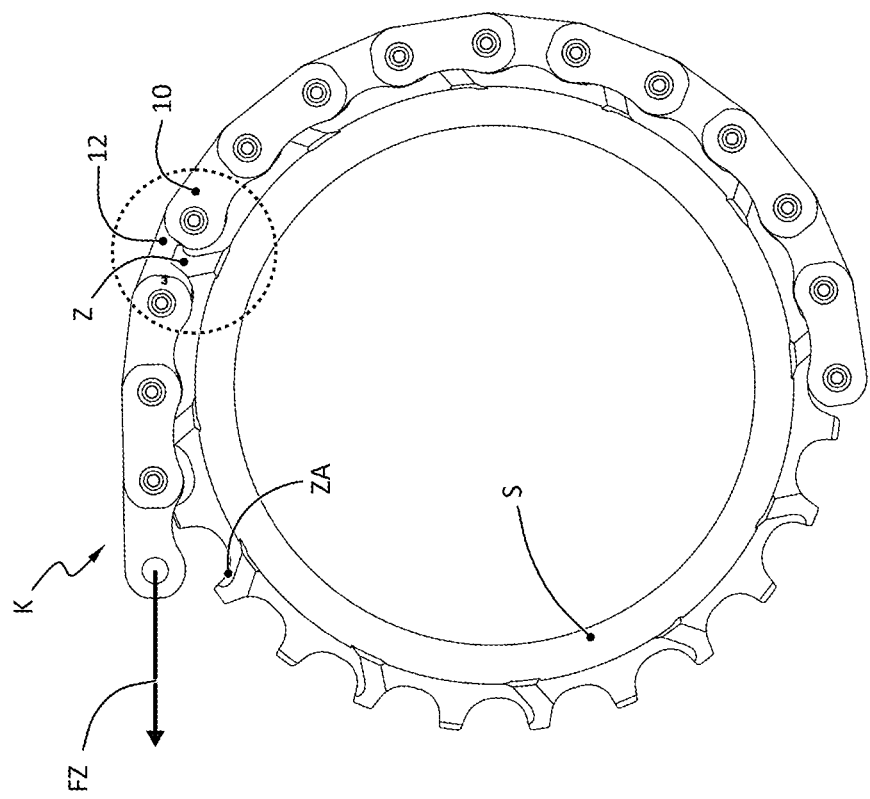
Figure 33:
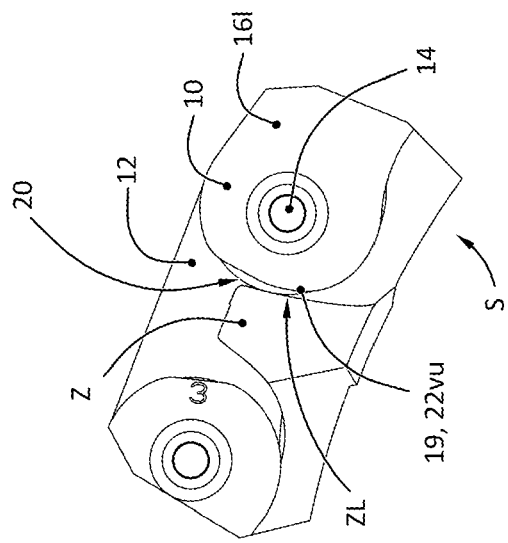
FIGS. 32 to 33 illustrate an embodiment of a bicycle chain.
Figure 32:
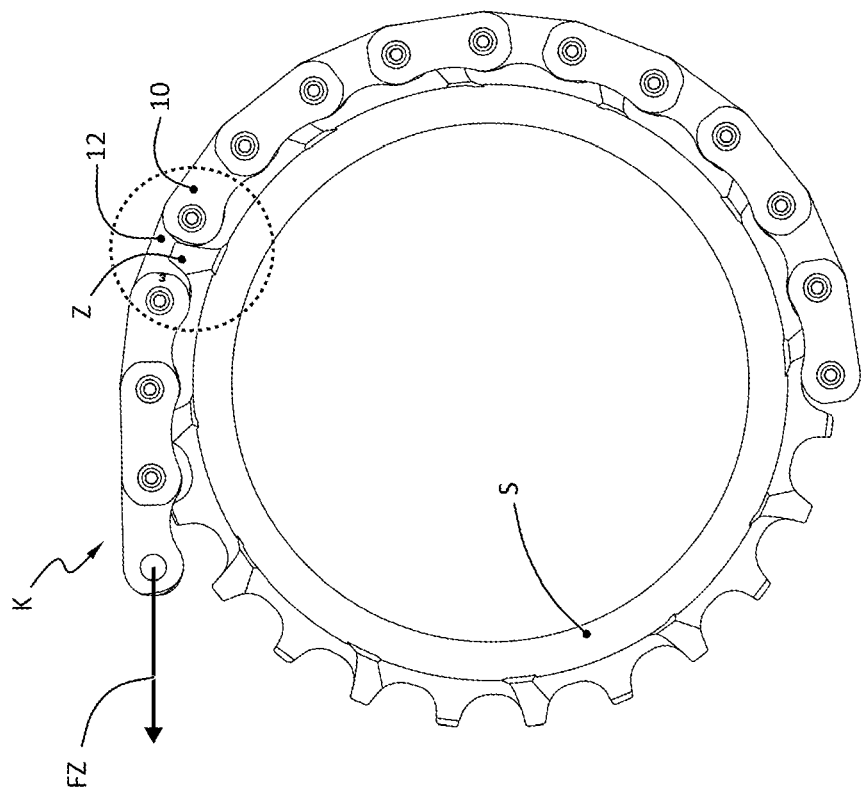

In the figures:

FIG. 1 shows an exemplary bicycle having a bicycle chain according to the invention, in a side view from the right;

FIGS. 2A/2B show the load-free engagement of a bicycle chain, here having chain link plates which are asymmetric at the top/bottom, in a sprocket of a multiple sprocket set on the rear wheel of a bicycle in a top view and in a side view from the right (although a chain according to one exemplary embodiment of the invention is illustrated here, FIGS. 2A/2B also apply in the same manner to the prior art);

FIGS. 3 to 5 show an inner link plate of an inner link plate chain link of a bicycle chain according to the prior art in three main views;

FIGS. 6 to 8 show an inner link plate of an inner link plate chain link of a bicycle chain according to one exemplary embodiment of the invention in the three views according to FIGS. 3 to 5;

FIG. 9 shows the inner link plate according to FIGS. 3 to 5 in a perspective view;

FIG. 10 shows the inner link plate according to FIGS. 6 to 8 in a view corresponding to FIG. 9;

FIGS. 11A/11B show an inner link plate chain link of a bicycle chain according to one exemplary embodiment of the invention in two perspective views;

FIGS. 12/13 show the engagement of a bicycle chain according to the prior art under load in a sprocket, in a side view from the left, and also an enlarged detail illustration according to the dashed marking in FIG. 12;

FIGS. 14/15 show the situation according to FIGS. 12/13 with a bicycle chain according to one exemplary embodiment of the invention;

FIGS. 16/17 show the engagement of a bicycle chain according to the prior art, during the outboard shifting under load, in a sprocket pair of a multiple sprocket set, in a side view from the left, and also an enlarged detail illustration according to the dashed marking in FIG. 16;

FIGS. 18/19 show the situation according to FIGS. 16/17 with a bicycle chain according to one exemplary embodiment of the invention;

FIGS. 20 to 22 show the situation according to FIGS. 16/17 with a bicycle chain according to the prior art in a view from behind (FIG. 20) and in further views;

FIGS. 23 to 25 show the situation according to FIGS. 18/19 with a bicycle chain according to one exemplary embodiment of the invention in further views corresponding to FIGS. 20 to 22;

FIGS. 26/27 show four links of a bicycle chain according to the prior art in a top view and side view;

FIGS. 28/29 show four links of a bicycle chain according to one exemplary embodiment of the invention in a top view and side view;

FIGS. 30/31 show the engagement of a bicycle chain according to the prior art under load in a sprocket, in a side view from the left, and also an enlarged detail illustration according to the dashed marking in FIG. 30; and FIGS. 32/33 show the situation according to FIGS. 30/31 with a bicycle chain according to one exemplary embodiment of the invention and with modified left-side tooth flanks on the sprocket;

FIGS. 34-36 show three further exemplary embodiments of an inner link plate according to the invention in each case in different views or partial views in the respective partial Figures A to D.

FIGS. 3-5, 9, 12, 13, 16, 17, 20-22, 26, 27, 30 and 31 each illustrate examples according to the prior art, and FIGS. 1, 2A, 2B, 6-8, 10, 11A, 11B, 14, 15, 18, 19, 23-25, 28, 29, 32 and 33 and also 34 to 36 illustrate exemplary embodiments of the invention, wherein identical or corresponding features are provided with the same reference signs in all cases. The exemplary embodiments of the invention are primarily described to the extent that they differ from the prior art, to the description of which reference is otherwise made.

In order not to overload the figures, in each figure not all of the features are provided with reference signs, but rather primarily only those features which are required for explaining the respective figure.

FIG. 1 shows by way of example a bicycle B having a drive arrangement D according to one exemplary embodiment of the invention. The drive arrangement D comprises a front sprocket CR, a rear sprocket set R having a plurality of sprockets S, and a chain K which can be moved from one sprocket S to the next by means of the rear derailleur RD.

The direction details used below of right/left and front/rear relate to a bicycle B in the direction of travel, i.e. correspond to the cyclist's perspective on the bicycle B.

The bicycle frame F typically has a left and a right rear dropout or frame eye, between which the rear wheel RW is mounted. The rear wheel RW rotates together with the sprocket set R about the rear wheel axle A. The term axially relates here to the rear wheel axle A or the axis of rotation A of the sprocket set R or to a direction which is parallel thereto and in FIG. 1 runs perpendicularly to the plane of the drawing.

The diameter of the sprockets S decreases axially outwards, i.e. the largest sprocket is arranged axially further on the inside or "inboard" or, according to the above explanations regarding direction details, further to the left than the smaller sprockets. Accordingly, the term "outboard shifting" describes a shifting operation in which the chain is transferred from a larger sprocket to an adjacent smaller sprocket, i.e., during shifting on the rear wheel, axially outwards or to the right. The above explanations relate to a bicycle both having a drive arrangement which is known and having a drive arrangement according to the invention.

FIGS. 2A and 2B show, in a top view from above and in a side view from the right, a larger sprocket S1, and a smaller sprocket S2, which is adjacent on the outboard side, of the sprocket set R, and also part of the chain K according to one exemplary embodiment of the invention, which part is in engagement here in a load-free manner with the larger sprocket S1.

As the figures show, the chain K comprises alternatingly arranged inner link plate chain links 10 and outer link plate chain links 12 that are connected pivotably to one another by means of chain pins 14.

The inner link plate chain links 10 each comprise two inner link plates 16 which are arranged opposite one another in a mirror-inverted manner in the axial direction, and the outer link plate chain links 12 each comprise two outer link plates 18 which are arranged opposite one another in a mirror-inverted manner in the axial direction.

A portion of the chain K according to the prior art or exemplary embodiment of the invention is once again illustrated separately in each case in a top view and a side view in FIGS. 26 and 27, and 28 and 29 respectively, wherein the outer link plates facing the observer have been omitted in the side views of FIGS. 27 and 29.

When the chain K is in engagement with a sprocket, with the larger sprocket S1 as in FIG. 2, the sprocket teeth Z then engage in the interspaces 10z and 12z between the inner link plates 16 and between the outer link plates 18 (also see FIG. 26).

In order to be able to show the engagement of the sprocket teeth Z at least in the interspaces 12z between the outer link plates 16, the right or outboard-side outer link plates 16 are omitted in the illustration of FIG. 2B.

Since the inner link plates 16 are more closely adjacent than the outer link plates 18, laterally guiding contact between the sprocket teeth Z and the chain K takes place primarily in the region of the inner link plates 16.

The inner link plates 16 which are illustrated individually in various views in FIGS. 3 to 5 and 9 for the prior art and in FIGS. 6 to 8 and 10 for the exemplary embodiment of the invention each have an elongate form and each have, in the longitudinal direction L, two opposite longitudinal end regions 22 having a conventionally rounded outer contour, wherein the end regions are connected via a connecting region 23 having a generally tapered outer contour at least on the lower edge (cf. FIGS. 3 to 5). The entire inner link plate outer periphery or outer contour is denoted here by 21.

As explained at the beginning, the details "top" and "bottom" relate here to the upper strand of the bicycle chain K when mounted on the bicycle.

Punched holes 16o are provided in the end regions of the inner link plates 16 conventionally concentrically with respect to the rounded outer contour. The chain pins 14 are pressed into the punched holes in the outer link plates 18 (cf. FIG. 27) while there is always sufficient play between the punched holes 16o in the inner link plates 16 and the chain pins 14 in order to ensure the rotatability between the chain links 10, 12.

The inner link plates 16 have collars 16c on their inner side 16i customarily in the region of the punched holes 16o (cf. FIG. 9), wherein a chain roller 20 is in each case mounted rotatably on a pair of collars 16c arranged in a mirror-inverted manner with respect to one another (and therefore also over the chain pin 14) (cf. FIGS. 11A/B). The cylindrical inner surface 26 of the collars 16c forms a contact surface for the chain pins 14, and the cylindrical outer surface 28 of the collars 16c forms a contact surface for the chain rollers 20.

In order to facilitate entry of the sprocket teeth Z into the interspaces 10z between the inner link plates 16 in as jolt-free a manner as possible, chamfers 25 are provided on the inner sides 16i of said inner link plates, over at least part of the outer circumference, said chamfers in particular forming a type of inlet funnel for the sprocket teeth. For historic or manufacturing reasons, in the region of the longitudinal ends 22 there can be in each case a central outer contour region 27 without a chamfer, but it is also conceivable and envisaged to design the chamfer continuously at these locations.

The inner link plates, known from the prior art, in FIGS. 3 to 5 and 9 are constructed substantially mirror-symmetrically with respect to a centre plane E which runs perpendicularly to a longitudinal direction L of the link plates and is indicated in FIG. 3 where it runs perpendicular to the plane of the drawing.

In relation to the chain rollers which are to be provided on the collars 16c and which are not illustrated in FIGS. 3 to 5, the inner link plates have both a longitudinal protrusion (at 22) and also a transverse protrusion (at 24), i.e. a protrusion in relation to the chain roller in the longitudinal and in the transverse direction. As FIG. 3 in particular illustrates, the inner link plates in the prior art are formed symmetrically to an extent such that a front and a rear longitudinal protrusion (i.e. a protrusion in the front and rear longitudinal end region 22h, 22v in relation to the front or rear chain roller 20) is substantially identical. Each of the longitudinal protrusions can be furthermore divided into an upper and a lower longitudinal protrusion (a protrusion in the upper and lower part 22o, 22u of the longitudinal end region 22), which longitudinal protrusions are likewise substantially identical.

Overall, the known inner link plate 16 thus has, in the front upper longitudinal end region 22vo, in the front lower longitudinal end region 22vu, in the rear upper longitudinal end region 22ho and in the rear lower longitudinal end region 22hu, a respective (longitudinal) protrusion in relation to the associated chain roller, said protrusions being formed substantially symmetrically with respect to one another (cf. FIG. 9). The regions of the inner link plate 16 in which there is a transverse protrusion are marked with 24.

In the case of the inner link plates 16 according to the invention of FIGS. 6 to 8 and 10, this symmetry is broken by the fact that the radial extent of the inner link plate is reduced in a certain region 19 of the inner link plate outer periphery 21, said region in each case being indicated by a dashed oval in FIGS. 8 and 10, and therefore accordingly the protrusion of the inner link plate 16 in relation to the chain roller, not illustrated in these figures, is also reduced. In regions, the protrusion is even negative such that, in a side view, the chain rollers 20 partially project over the inner link plates 16, as can be seen for example in FIG. 15.

In the exemplary embodiment of FIGS. 6 to 8 and 10, there is a reduced protrusion in a front lower longitudinal end region 22vu, which protrusion is reduced in comparison to the protrusion in the front upper longitudinal end region 22vo, in the rear lower longitudinal end region 22hu and in the rear upper longitudinal end region 22ho (cf. FIG. 10).

The size and extent of the reduced protrusion of the aforementioned exemplary embodiment are clear in particular from FIGS. 6 and 8 in which in addition the course of the outer contour 21 of a conventionally designed chain inner link plate according to the prior art (cf. FIGS. 3 and 5) is shown in each case by means of a dotted line.

An exemplary embodiment of an inner link plate chain link 10 which comprises two inner link plates 16 according to FIGS. 6 to 8 and 10 and which is illustrated in two perspective views in FIG. 11A and FIG. 11B thus has a reduced longitudinal protrusion only in the front lower longitudinal end region 22vu of the inboard-side chain link plate 16l and in the rear lower longitudinal end region 22hu of the outboard-side chain link plate 16r, i.e. only at "f" and "d", as can best be seen in FIG. 11B.

Figure 13:
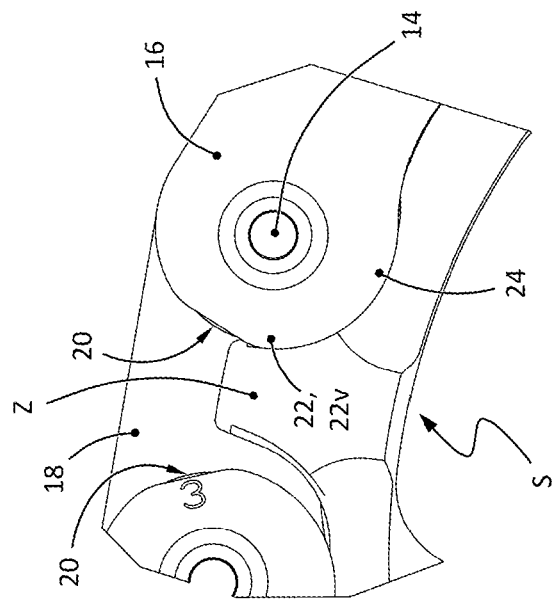
FIGS. 12 to 13 illustrate prior art chain.
Figure 15:
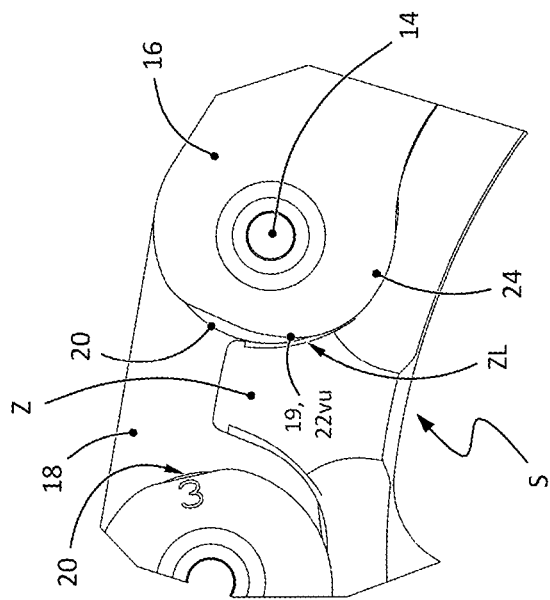
FIGS. 14 to 15 illustrate an embodiment of a bicycle chain.

FIGS. 12 and 13 illustrate the guide function of the longitudinal and transverse protrusion at 22 and 24 of the inner link plates 16 during the engagement of the chain K, which is known from the prior art, in a sprocket S under load, i.e. if a tensile force FZ acts on the chain; FIGS. 14 and 15 illustrate the same situation for a chain K according to the invention. In order to be able to identify the engagement of the inner link plate links with the chain inner link plates 16 on the load flanks ZL of the sprocket teeth Z, most of the chain link plates 18 located at the front with reference to the drawing have been omitted in FIGS. 12 and 15 for illustrative purposes.

The region 19 of the inner link plate outer periphery 21 having a reduced or negative longitudinal protrusion is selected according to the invention in such a manner that the shifting problems present in the prior art during outboard shifting are reduced or eliminated, as has already been explained more precisely at the beginning with reference to FIGS. 16 to 25, with FIGS. 16 to 17 and 20 to 22 illustrating the outboard shifting in the prior art, and FIGS. 18 and 19 and also 23 to 25 illustrating the outboard shifting for one exemplary embodiment of the present invention.

FIGS. 17 and 19 are a detail enlargement of the region marked with a dashed oval in FIGS. 16 and 18, respectively. FIGS. 22 and 25 are a detail enlargement of the region marked with a dashed circle in FIGS. 20 and 23, respectively, and FIGS. 21 and 24 are an enlarged side view from the left of the region marked with a dashed rectangle in the view from the rear in FIGS. 20 and 23, respectively. In FIGS. 21 and 24, the chain rollers have been omitted; in FIG. 24, the inboard-side outer link plate of the final chain link still in engagement with the larger sprocket has additionally been omitted.

As can best be seen in FIGS. 17 and 19, during the outboard shifting first of all a certain inner link plate chain link 10.1 passes a certain tooth Z1 of the larger sprocket S1, on the side (outboard side) thereof facing the smaller sprocket S2 (cf. also FIGS. 20/21 and FIGS. 23/24).

A tooth Z2, following in the sprocket direction of rotation Q, of the smaller sprocket S2 then enters the link plate interspace of a chain link of the overrunning chain portion K2 (at "c" in FIGS. 16 to 25).

This operation is associated with bending of the overrunning chain portion K2 radially inwards about a certain chain pin 14.1 of the last outer link plate chain link 12.1 still in engagement with the larger sprocket S1 counter to the direction of rotation (at "a" in FIGS. 16 to 25). It is pointed out that, for reasons of better illustration, the left or inboard-side outer link plate of the outer link plate chain link 12.1 (at "a") has been omitted in FIGS. 16-19.

The bending movement of the chain K during the transfer to the smaller sprocket S2 is therefore linked with a rotation of the associated inner link plate link 10.1 (at "b" in FIGS. 16 to 25) about the chain pin 14.1 in relation to the preceding outer link plate chain link 12.1 which is still in engagement on the outer sprocket S1 (at "a" in FIGS. 16 to 25) and with a corresponding movement of the periphery of the rounded outer contour of the left (inboard-side) bending inner link plate 161 relative to the adjacent tooth load flank ZL (cf. FIGS. 17, 19 and 24).

If the outer contour 21 of the bending left inner link plate 161 lies here against the adjacent tooth load flank ZL, which is the case in the prior art (cf. FIG. 17), then at this point—unlike in the event of contact between chain roller and tooth of the sprocket in which a low-friction rolling operation of the chain roller on the flank of the tooth takes place—pressing or sliding friction occurs which prevents the pivoting movement of the bending inner link plate chain link 10.1 and therefore the switching operation and the maintaining of the tangential condition described further above.

In addition to the friction arising at this point in the prior art between the outer contour 21 of the bending left inner link plate 161 and the tooth load flank ZL, it is also possible, depending on the geometry of the load flank ZL of the last sprocket tooth Z0 of the larger sprocket S1 to emerge from the outgoing chain portion K1 there, for the formation of a torque "M" to occur (cf. FIG. 17) which can be formed from the chain tensile force X acting on the inner link plate 10.1, on the one hand, and from the counterforce Y which is eccentric thereto (depending on the geometry of the load flank ZL and the chain link plate outer contour 21) and is transmitted from the load flank ZL to the outer contour 21 of the inner link plate 10.1.

This torque M thus attempts to prevent the bending chain link 10.1 (at "b" in FIG. 17) from bending and instead to stretch the overrunning chain portion K2.

A further effect of the front periphery 21 of the left inner link plate 161 of the bending inner link plate chain link, said front periphery colliding in the prior art with the load flank ZL of the last emerging sprocket tooth Z0 (cf. FIGS. 17, 20 and 22), resides in the fact that, by this means, not only is the desired frictionless bending movement of said inner link plate chain link disturbed, but so too is the lateral displacement, which has already begun before said bending movement, of the overrunning chain portion (cf. FIGS. 20/22) by means of the shifting mechanism RD, by means of which lateral displacement the outboard shifting is initiated. The collision between the front longitudinal end region 22v of the outer contour 21 of the inboard-side inner link plate 161 and the last emerging sprocket tooth Z0 for a chain K according to the prior art can be seen particularly readily in FIG. 22.

These friction forces and reaction torques M occurring in the contact region between the outer periphery 21 of the inner link plate 161 of the bending chain link "b" with the last emerging sprocket tooth Z0 of the larger sprocket S1 are critical in particular whenever it is desirable, as is described above as being desirable, it is intended for the tangential condition to be met during the outboard shifting, i.e. when the chain portion K2 running over between the sprockets (cf. FIGS. 16 and 20) is intended as closely as possible to depict a theoretical tangent T to the smaller sprocket S2, starting from the incoming chain portion K3, which is already in engagement in the smaller sprocket S2, to the outgoing chain portion K1, which is still in engagement with the larger sprocket S1 (cf. FIG. 16).

This problem explained above is overcome according to the invention by the outer contour 21 of the inboard-side inner link plates 161 being recessed at least precisely in the region 19 in which the collision or friction with the load flank ZL of the last emerging sprocket tooth Z0 would occur in the prior art during outboard shifting, as emerges in particular from the above-described comparison of the exemplary embodiment of the invention illustrated in FIGS. 14, 15, 18, 19, 23-25, 28, 29 and 32-33 with the corresponding illustrations with regard to the prior art in FIGS. 12, 13, 16, 17, 20 to 22, 26, 27, 30 and 31.

FIG. 23 furthermore reveals the interaction between the bicycle chain and sprockets having alternatingly thick (broad) teeth Zb and thin (narrow) teeth Zs, in particular during the shifting operation. Sprockets of this type are particularly advantageous because of the improved keeping to the designated chain travel, in particular to the tangential condition, during the shifting transfer between adjacent sprockets that is thus possible (cf. further above under "Conditions for shifting to the larger sprocket", and also the description of the tangential condition further above in "Outboard shifting procedure").

Also, when front sprockets having such alternatingly thick (broad) teeth Zb and thin (narrow) teeth Zs are used, there are reduced requirements on the inner link plate protrusion 22, 24 for the purpose of guiding the chain on the teeth of the sprockets (cf. FIG. 13 and also above under "Explanation of the inner link plate protrusion"). As already mentioned in the introductory part of the description, the chain according to the invention is particularly suitable for these reasons for use together with sprockets and sprockets having alternatingly broad teeth Zb and narrow teeth Zs.

A portion of a chain K constructed with inner link plate chain links 10 according to FIG. 11 is illustrated separately once again in FIGS. 28 and 29, wherein, in FIG. 28, the regions 19 of reduced outer contour are in each case marked by a dashed circle.

As illustrated in FIGS. 30 to 33, in addition, when a chain according to the invention is used, recesses or milled grooves ZA (cf. FIGS. 30/31) provided in the prior art on the left side of the sprockets S for receiving the inner link plate longitudinal protrusion are reduced or are completely omitted, as illustrated in FIGS. 32/33, because of the inner link plate longitudinal protrusion that is partially reduced according to the invention. This increases the effective width of the tooth load flank ZL, which improves the transmission of force between the chain K and the sprocket S and in particular increases the service life of the sprocket S.

FIGS. 34 to 36 finally illustrate various possibilities of, in an inner link plate 16 according to the invention, designing the transition between the region 19 of the inner link plate outer periphery 21 having a reduced longitudinal protrusion 22 and the generally flat inner side 16i of the inner link plate 16 or of the adjacent chamfer 25, namely as a simple edge 28z (cf. FIG. 34), as a further chamfer 30 or as a rounded edge 32. The two last-mentioned possibilities further reduce the probability of the disturbances described at the beginning occurring during outboard shifting operations.

In an embodiment, inner link plate (16) for a bicycle chain (K) having chain rollers (20), wherein a protrusion of the inner link plate (16) in relation to the respectively assigned chain roller (20) in a front lower longitudinal end region ($22vu$) of an inner link plate outer periphery (21) is reduced, and is preferably negative at least in regions, in comparison to the protrusion in a front upper longitudinal end region ($22vo$) or/and in a rear lower longitudinal end region ($22hu$) of the inner link plate outer periphery (21).

The protrusion of the inner link plate (16) in relation to the respectively assigned chain roller (20) furthermore also in a rear upper longitudinal end region ($22ho$) of the inner link plate outer periphery (21) may be reduced, and is preferably negative at least in regions, in comparison to the protrusion in a front upper longitudinal end region ($22vo$) or/and a rear lower longitudinal end region ($22hu$) of the inner link plate outer periphery (21).

The protrusion of the inner link plate outer periphery (21) over the respectively assigned chain roller (20) may be reduced or may be negative within an angular range (a).

In an embodiment. a bicycle chain (K) may have alternatingly arranged inner link plate chain links (10) and outer link plate chain links (12), which chain links are connected pivotably to one another by means of chain pins (14), wherein a chain roller (20) is provided at each chain pin (14), and wherein the inner link plate chain links (10) have inboard-side inner link plates (16l) according to one of the additionally described embodiments. For each inner link plate chain link (10), the protrusion of the inboard-side inner link plate (16l) in relation to the respectively assigned chain roller (20) in a front lower longitudinal end region ($22vu$) of the inner link plate outer periphery (21) may be reduced, and may be preferably negative at least in regions, in comparison to the protrusion in a rear lower longitudinal end region ($22hu$) of the inner link plate outer periphery (21) of the inboard-side inner link plate (16l) and in comparison to the protrusion in a front lower longitudinal end region ($22vu$) and in a rear lower longitudinal end region ($22hu$) of the inner link plate outer periphery (21) of the outboard-side inner link plate (16r). For each inner link plate chain link (10), the protrusion of the inboard-side inner link plate (16l) in relation to the respectively assigned chain roller in a front lower longitudinal end region ($22vu$) of the inner link plate outer periphery (21) of the inboard-side inner link plate (16l) may be reduced, and may be negative at least in regions, in comparison to the protrusion in a rear lower longitudinal end region ($22hu$), and wherein the protrusion of the outboard-side inner link plate (16r) in a rear lower longitudinal end region ($22hu$) of the inner link plate outer periphery (21) is reduced, and is preferably negative at least in regions, in comparison to the protrusion in a front lower longitudinal end region ($22vu$) of the outer periphery (21) of the outboard-side inner link plate (16r). For each inner link plate chain link (10), the protrusion of the inboard-side inner link plate (16l) and of the outboard-side inner link plate (16r) in each case in a front lower longitudinal end region ($22vu$) and in a rear lower longitudinal end region ($22hu$) may be reduced, and may be negative at least in regions, in comparison to the protrusion in a front upper longitudinal end region ($22vo$) and in a rear upper longitudinal end region ($22ho$). For each inner link plate chain link (10), the protrusion of the inboard-side inner link plate (16l) in a front lower longitudinal end region ($22vu$) and in a rear upper longitudinal end region ($22ho$) of the inner link plate outer periphery (21) may be reduced, and may be negative at least in regions, in comparison to the protrusion in a front upper longitudinal end region ($22vo$) and in a rear lower longitudinal end region ($22hu$) of the inner link plate outer periphery (21) of the inboard-side inner link plate (16l), and wherein the protrusion of the outboard-side inner link plate (16r) in a front upper longitudinal end region ($22vo$) and in a rear lower longitudinal end region ($22hu$) is reduced, and is preferably negative at least in regions, in comparison to a protrusion in a front lower longitudinal end region ($22vu$) and in a rear upper longitudinal end region ($22ho$) of the inner link plate outer periphery (21) of the outboard-side inner link plate (16r).

The bicycle chain may have chain link plates with asymmetry at the top and/or bottom.

In an embodiment, a drive arrangement (D) for a bicycle (B) is provided. The drive arrangement has a larger sprocket (S1) and a smaller sprocket (S2) adjacent on the outboard side, and having a bicycle chain (K) as has been described herein. Because of the regionally reduced longitudinal protrusion of the inboard-side inner link plates (16l), during the outboard shifting between the two sprockets (S1, S2) the load flank (ZL) of the last sprocket tooth (Z0) of the larger sprocket (S2) to emerge from the outgoing chain portion (K1) does not come into contact with the outer periphery (21) of the inboard-side inner link plate (16l) of the first bending inner link plate chain link (10.1). During the outboard shifting, a chain portion (K2) running over from the larger sprocket (S1) to the smaller sprocket (S2) may form a tangent (T) to the smaller sprocket (S2). The bicycle drive system may include at least one chain wheel with an even number of teeth and with alternatingly thick and thin teeth (Z), having a bicycle chain (K) and/or drive arrangement as described herein.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An inner link plate for a bicycle chain having chain rollers, comprising:
   a protrusion of the inner link plate in relation to a respectively assigned chain roller in a front lower longitudinal end region of an inner link plate outer periphery is reduced in comparison to a protrusion in a front upper longitudinal end region or in a rear lower longitudinal end region of the inner link plate outer periphery,
   wherein the protrusion of the inner link plate in relation to a respectively assigned chain roller in the front lower longitudinal end region of the inner link plate outer periphery is negative at least in regions, in comparison to the protrusion in the front upper longitudinal end region or in the rear lower longitudinal end region of the inner link plate outer periphery.

2. The inner link plate according to claim 1, wherein any protrusion of the inner link plate outer periphery over the respectively assigned chain roller is reduced or is negative within an angular range.

3. An inner link plate for a bicycle chain having chain rollers, comprising:
   a protrusion of the inner link plate in relation to a respectively assigned chain roller in a front lower longitudinal end region of an inner link plate outer periphery is reduced in comparison to a protrusion in a front upper longitudinal end region or in a rear lower longitudinal end region of the inner link plate outer periphery, wherein the protrusion of the inner link plate in relation to the respectively assigned chain roller also in a rear upper longitudinal end region of the inner link plate outer periphery is reduced, and is negative at least in regions, in comparison to the protrusion in the front upper longitudinal end region or the rear lower longitudinal end region of the inner link plate outer periphery.

4. A bicycle chain, comprising:
alternatingly arranged inner link plate chain links and outer link plate chain links, which chain links are connected pivotably to one another by means of chain pins, and a chain roller provided at each chain pin,
wherein the inner link plate chain links have inboard-side inner link plates, each of which includes a protrusion in relation to a respectively assigned chain roller in a front lower longitudinal end region of an inner link plate outer periphery is reduced, and is negative at least in regions, in comparison to a protrusion in a front upper longitudinal end region or in a rear lower longitudinal end region of the inner link plate outer periphery.

5. The bicycle chain according to claim 4, wherein, for each inner link plate chain link, the protrusion of the inboard-side inner link plate in relation to the respectively assigned chain roller in the front lower longitudinal end region of the inner link plate outer periphery is reduced, and is preferably negative at least in regions, in comparison to the protrusion in the rear lower longitudinal end region of the inner link plate outer periphery of the inboard-side inner link plate and in comparison to a protrusion in a front lower longitudinal end region of an inner link plate outer periphery of an outboard-side inner link plate and a protrusion in a rear lower longitudinal end region of the inner link plate outer periphery of the outboard-side inner link plate.

6. The bicycle chain according to claim 4, wherein, for each inner link plate chain link, the protrusion of the inboard-side inner link plate in relation to the respectively assigned chain roller in the front lower longitudinal end region of the inner link plate outer periphery of the inboard-side inner link plate is reduced, and is negative at least in regions, in comparison to the protrusion in the rear lower longitudinal end region of the inner link plate outer periphery of the inboard-side inner link plate, and wherein a protrusion of an outboard-side inner link plate in a rear lower longitudinal end region of an inner link plate outer periphery of the outboard-side inner link plate is reduced, and is negative at least in regions, in comparison to a protrusion in a front lower longitudinal end region of the inner link plate outer periphery of the outboard-side inner link plate.

7. The bicycle chain according to claim 4, wherein, for each inner link plate chain link, the protrusion of the inboard-side inner link plate and a protrusion of an outboard-side inner link plate in each case in the front lower longitudinal end region and in the rear lower longitudinal end region, in each case, is reduced, and is negative at least in regions, in comparison to the protrusion in the front upper longitudinal end region and in a rear upper longitudinal end region.

8. The bicycle chain according to claim 4, wherein, for each inner link plate chain link, the protrusion of the inboard-side inner link plate in the front lower longitudinal end region and in a rear upper longitudinal end region of the inner link plate outer periphery of the inboard-side inner link plate is reduced, and is negative at least in regions, in comparison to the protrusion in the front upper longitudinal end region and in the rear lower longitudinal end region of the inner link plate outer periphery of the inboard-side inner link plate, and wherein a protrusion of an outboard-side inner link plate in a front upper longitudinal end region and in a rear lower longitudinal end region is reduced, and is preferably negative at least in regions, in comparison to a protrusion in a front lower longitudinal end region and in a rear upper longitudinal end region of an inner link plate outer periphery of the outboard-side inner link plate.

9. The bicycle chain according to claim 4, wherein the chain links have asymmetry at the top/bottom.

10. A drive arrangement for a bicycle, comprising:
a larger sprocket;
a smaller sprocket adjacent and on an outboard side of the larger sprocket; and
a bicycle chain including:
alternatingly arranged inner link plate chain links and outer link plate chain links, which chain links are connected pivotably to one another by means of chain pins, and
a chain roller provided at each chain pin, wherein the inner link plate chain links have inboard-side inner link plates, each of which include a protrusion in relation to a respectively assigned chain roller in a front lower longitudinal end region of an inner link plate outer periphery is reduced, and is negative at least in regions, in comparison to a protrusion in a front upper longitudinal end region or in a rear lower longitudinal end region of the inner link plate outer periphery, and
wherein, because of the regionally reduced longitudinal protrusion of the inboard-side inner link plates, during the outboard shifting between the two sprockets, a load flank of a last sprocket tooth of the larger sprocket to emerge from an outgoing chain portion does not come into contact with inner link plate outer periphery of the inboard-side inner link plate of a first bending inner link plate chain link.

11. The drive arrangement according to claim 10, wherein, during the outboard shifting, a chain portion running over from the larger sprocket to the smaller sprocket forms a tangent to the smaller sprocket.

12. The bicycle drive system according to claim 10, further comprising:
a chain wheel with an even number of teeth and with alternatingly thick and thin teeth.

* * * * *